United States Patent [19]

Jacobson

[11] 4,223,218
[45] Sep. 16, 1980

[54] METHODS AND APPARATUS FOR OPTIMIZING MEASUREMENTS OF THERMAL NEUTRON DECAY CHARACTERISTICS

[75] Inventor: Larry A. Jacobson, Houston, Tex.

[73] Assignee: Schlumberger Technology Corporation, New York, N.Y.

[21] Appl. No.: 955,175

[22] Filed: Oct. 26, 1978

[51] Int. Cl.² ............................................. G01V 5/00
[52] U.S. Cl. .................................. 250/262; 250/269
[58] Field of Search ............... 250/262, 269, 264, 266, 250/265, 270

[56] References Cited

U.S. PATENT DOCUMENTS

| | | | |
|---|---|---|---|
| Re. 28,477 | 7/1975 | Nelligan | 250/262 |
| 3,373,280 | 3/1968 | Mills | 250/262 |
| 3,379,882 | 4/1968 | Youmans | 250/262 |
| 3,662,179 | 5/1972 | Frentrop et al. | 250/262 |
| 3,971,935 | 7/1976 | Nelligan | 250/262 |
| 4,097,737 | 6/1978 | Mills | 250/269 |
| 4,122,338 | 10/1978 | Smith et al. | 250/262 |

Primary Examiner—Alfred E. Smith
Assistant Examiner—Carolyn E. Fields

[57] ABSTRACT

In the exemplary embodiments of the invention disclosed, the decay of the thermal neutron concentration in an earth formation following irradiation thereof with a burst of fast neutrons is measured by detecting indications of the thermal neutron concentration during a sequence of contiguous, discrete time gates between neutron bursts. The time gate sequence begins following a discrete time delay after the commencement of the preceding neutron burst and extends over the entire, or substantially the entire, remainder of the interval between neutron bursts. The time gates are grouped into a number of gate groups, e.g. four, each of which includes a number, e.g. four, of discrete time gates. Both the time gates within each group and the groups themselves are contiguous in time. The durations of the individual discrete time gates within the separate groups are equal, but the duration of the time gates progressively increases from group to group in the sequence. The duration of the neutron bursts, the duration of time delay between the end of the bursts and the beginning of the gating sequence, and the durations of the individual time gates may all be adjusted by a common, selected one of a finite number, e.g. four, of scale factor values. Selection of the particular scale factor value used in the measurement of a given formation is made in a manner to optimize the statistical precision of the measurement of thermal neutron decay constants, e.g. $\tau$ and $\Sigma$, of the formation.

32 Claims, 21 Drawing Figures

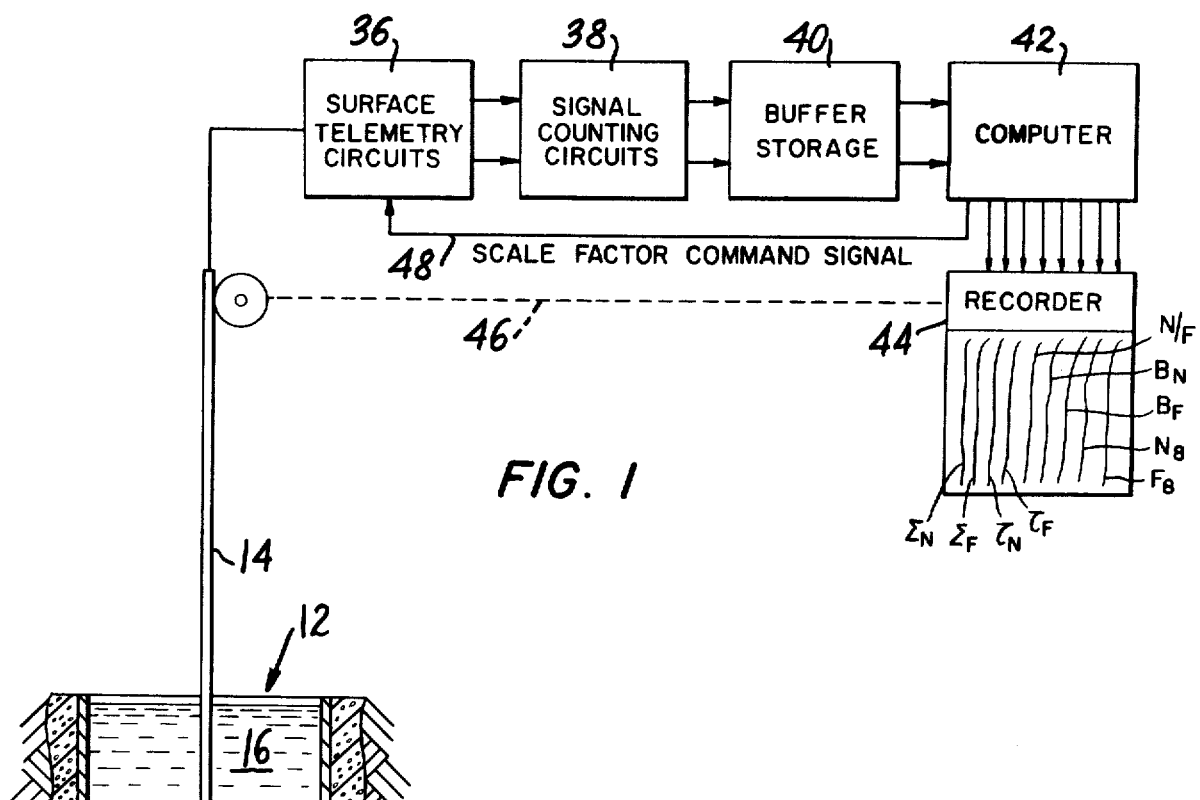
FIG. 1
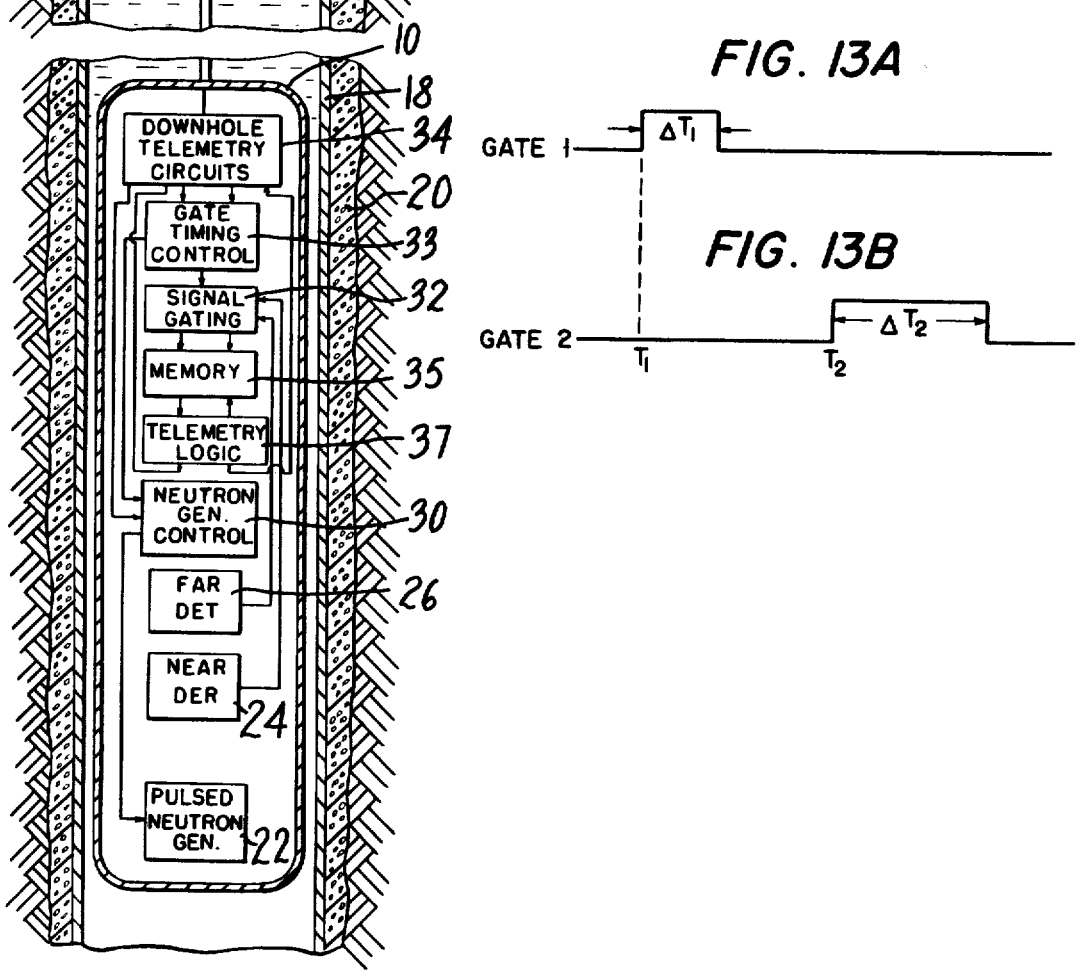
FIG. 13A
FIG. 13B

TELEMETRY FRAME STRUCTURE

METHODS AND APPARATUS FOR OPTIMIZING MEASUREMENTS OF THERMAL NEUTRON DECAY CHARACTERISTICS

BACKGROUND OF THE INVENTION

1. Field of the Invention

The present invention relates in general to nuclear well logging and, more particularly, to new and improved methods and apparatus for detecting the decay, or capture, of thermal neutrons in earth formations in a manner affording more accurate and reliable measurements of thermal neutron capture characteristics of the formation.

2. The Prior Art

Heretofore, pulsed-neutron capture logs have provided measurements of thermal neutron capture characteristics of earth formations, e.g. the thermal neutron decay time constant ($\tau$) and its correlative the macroscopic capture cross section ($\Sigma$), which have proven useful in differentiating between oil or gas-bearing formations and water-bearing formations. Such logs are especially useful in recognizing the presence of hydrocarbons in cased formations, and to detect changes in water saturation during the production life of a well.

Thermal neutron characteristic measurements are typically made by irradiating a formation with bursts of fast (e.g. 14 Mev) neutrons and following the decay of the thermal neutron concentration in the formation by counting the gamma rays emitted by formation nuclei upon the capture of thermal neutrons during discrete time intervals, or gates, following each neutron burst. In one prior tool disclosed in U.S. Pat. No. 3,379,882 to A. H. Youmans, the capture gamma rays are measured during two gates which are fixed both in time of occurrence after the burst and in duration. Although affording useful information in formations of average decay times, the Youmans fixed-gate system tends to yield unreliable measurements where the decay time of the formation is either very long or very short. Moreover, the gamma ray count rate measurement during the second fixed-gate is sometimes subject to excessive statistical variation, particularly in short decay time formations. In an important advance over the fixed-gate system, W. B. Nelligan in U.S. Pat. No. 3,566,116 (now Re. 28,477) patented a sliding-gate system in which three measurement gates are utilized and in which the time-after-burst occurrence and duration of all of the gates are automatically varied, in a feed-back loop operation, according to the currently measured value of the decay time constant. The first two gates are timed to detect capture gamma rays from the formation and the third gate is timed to detect background gamma rays. This system operates properly to position the gates for optimum background-corrected measurements over a wide range of decay times $\tau$ and cross sections $\Sigma$, thereby avoiding the deficiencies in respect of unreliability and statistical variation encountered in the fixed-gate system in cases of extreme decay rates. For still better results, Nelligan further provides that the duration and repetition rate of the neutron bursts could also be varied as a function of the currently measured decay time value. This affords the added advantage of maximizing the duty cycle of the neutron generator in a manner consistent with accurate measurement of the decay time value of the formation being logged. Later embodiments of the Nelligan sliding-gate concept are described in U.S. Pat. No. 3,662,179, granted May 9, 1972 to Frentrop et al., and U.S. Pat. No. 3,890,501 granted June 17, 1975 to C. W. Johnstone. Thermal neutron decay time logging, in accordance with the Nelligan sliding-gate technique as described in the aforementioned patents, is provided commercially by Schlumberger Well Services, and has become a widely accepted and important cased-hole service.

It is desirable, however, to improve still further this service. Specifically, it is desirable to provide still greater statistical precision in the measurements of $\tau$, $\Sigma$ and background by improvement in the manner of detection of the rate of decay of the thermal neutron concentration. Also, the infinitely variable, feed-back loop type of operation previously used with the Nelligan sliding-gate system is sometimes subject to "jitter" when low counting rates are encountered. That is to say, variations in the settings of the measurement gates and the neutron bursts sometimes result from statistical variations in the gamma ray count rates rather than as the result of any change in the decay time of the formation under investigation. Again, where the decay time drops sharply, such as at bed boundaries, the feed-back loop of the sliding-gate tool sometimes, though infrequently, fails to change the timing of the gates fast enough to keep up with the fall off in the gamma ray count rate. This could result in the tool measuring insufficient count rates for the feed-back loop to work properly, which situation could in turn leave the gates and bursts "latched" at positions later after the burst than would be optimum for the new decay time. Although this situation can be readily overriden manually and the gates quickly restored to the proper positions, it is desirable to avoid such inadvertent "latching" of the $\tau$ computation circuits. It additionally is desirable to provide for the measurement of all decay time values over the rull $\tau$ range normally encountered, e.g. from $<50$ $\mu$sec to $>600$ $\mu$sec, without any discontinuities.

SUMMARY OF THE INVENTION

The foregoing and other objects of the invention are attained, in accordance with the invention, by the provision of methods and apparatus for detecting the decay of the thermal neutron concentration in an earth formation following irradiation of the formation with discrete bursts of fast neutrons, in which such detection is made in a sequence of time gates, preferably contiguous in time, which begins following a discrete time delay after termination of the next preceding neutron burst and which extends over the full or substantially the full remainder of the interval between neutron bursts. Preferably, the time gates are arranged in contiguous groups of gates, each of which groups is itself made up of a plurality of individual discrete time gates of equal duration. Although equal within the separate groups, the durations of the discrete time gates increase progressively from group to group in the sequence of time gates. This has the advantage of concentrating the narrowest gates in the early region of the thermal neutron decay curve, where the rate of change of the decay curve is greatest, and the widest time gates in the later part of the decay curve, where the rate of change of the curve is more gradual. This detector gating technique affords enhanced statistical precision in the measurement of the rate of decay of the thermal neutron concentration.

Suitably, the duration of the discrete time gates is increased from group to group by a finite factor and preferably by a multiple of the preceding time gate duration. In a preferred embodiment, the duration of the time gates might be increased by a factor of two from group to group, i.e. the duration of each individual discrete time gate in the second-occurring gate group would be twice that of the first-occurring gate group, the duration of each discrete time gate in the third-occurring gate group would be twice that of the second-occurring gate group, etc.

In accordance with a further feature of the invention, the number of individual discrete time gates within each gate group is equal to the number of gate groups in the gating sequence. In a preferred embodiment there are four gate groups and four discrete gates within each gate group, for a total of 16 discrete time gates between neutron bursts.

According to still another feature of the invention, the duration of the discrete time gates in the gating sequence may be adjusted in real time by a selected one of a finite number of discrete scale factor values F, which is applied to all of the gates in common. The particular scale factor value used to measure the thermal neutron concentration decay in a given formation is selected so as to optimize statistical precision in the measurement of $\tau$ and $\Sigma$ and of background radiation. In actuality, a separate measurement of background is not required, the background being computed from count rates in selected ones of the later gates. Generally, larger values of the scale factor F are used for long $\tau$ formations and smaller values are used for short $\tau$ formations. Some measure of overlap in F values is allowed before a change in the scale factor is required, thereby tending to minimize timing adjustment of the detection gates as a result of the statistical variation in the detector output. According to the invention, it has been found that four scale factor values are sufficient to provide accurate and reliable measurements of all commonly encountered formations. For still greater statistical accuracy, the scale factor value F applied to the discrete time gates is also preferably applied to the duration of the neutron burst and to the duration of a discrete time delay between the termination of a burst and the commencement of the time gate sequence. In this way the duty cycle of the neutron generator, the time placement of the detector gating sequence relative to the occurrence of the neutron burst, and the durations of the respective time gates and gate groups may all be properly controlled to optimize the decay constant measurements of the particular formation under investigation. Such control of the neutron generator and the detector is preferably accomplished through use of a discrete clock frequency for each F value, which is used to drive a common control circuit for generating the neutron generator fire signal and the gate enabling signals for all of the detection gates. Adjustment of the duration of the neutron burst, time delay following the burst, and the discrete time gate intervals may therefore be readily carried out simply by selecting the particular clock frequency to be applied to the control circuit, and this in turn is accomplished when required via a command signal from the surface based upon the newly measured value of $\tau$.

BRIEF DESCRIPTION OF THE DRAWINGS

For a better understanding of the invention, reference may be made to the following description of exemplary embodiments thereof, taken in conjunction with the figures of the accompanying drawings, in which:

FIG. 1 is a schematic view of a representative well logging tool construction in accordance with the invention;

FIGS. 13A and 13B illustrate two generalized time gates for measuring thermal neutron concentrations;

DETAILED DESCRIPTION

Figure 2:
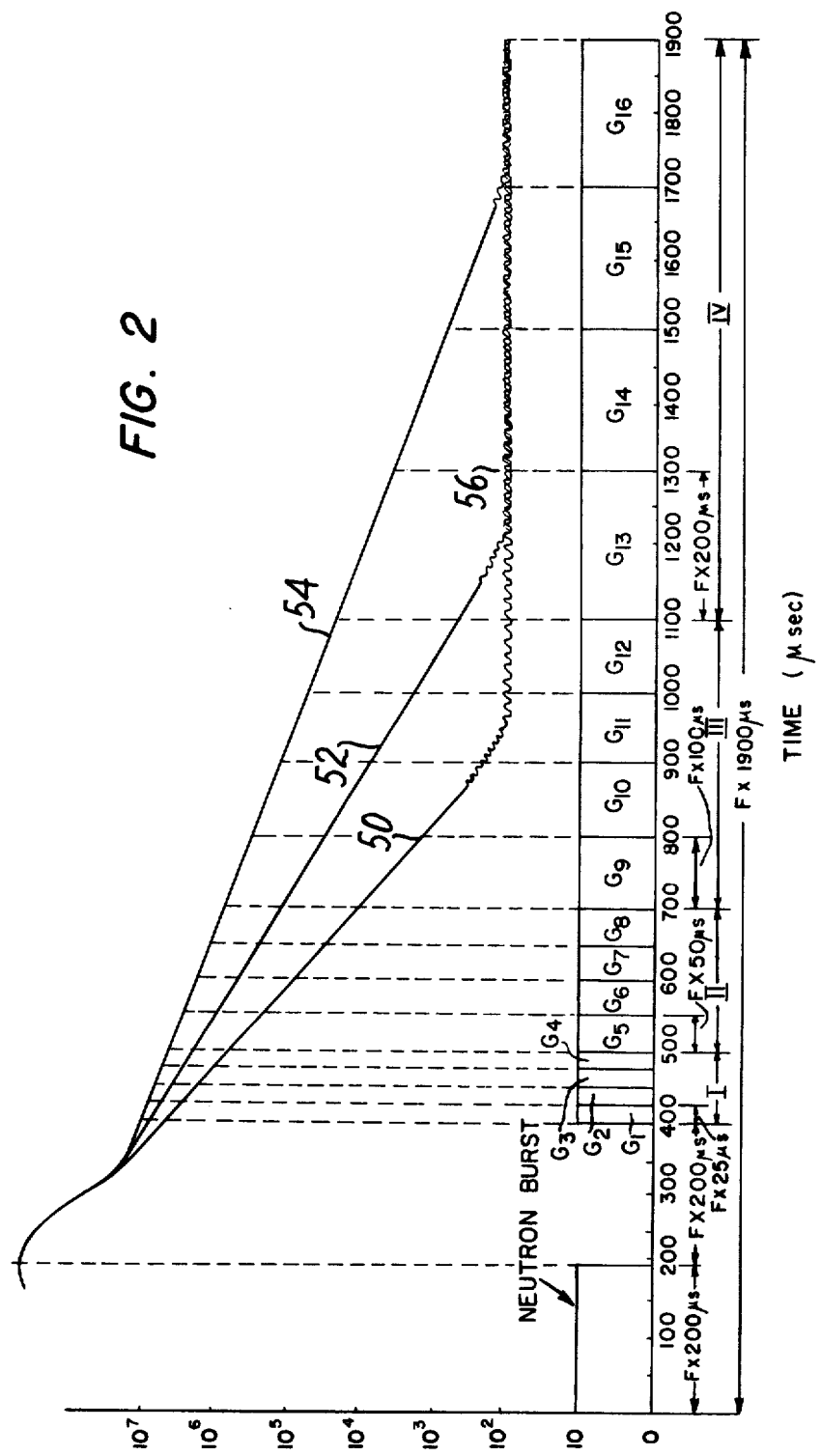
FIG. 2 is a graphical representation of illustrative thermal neutron concentration decay curves in three different formations and showing superimposed thereon a preferred neutron generator and detector gating regime in accordance with the invention.

In the exemplary embodiment of FIG. 1, a well logging tool constructed in accordance with the invention includes a fluid-tight, pressure-and-temperature resistant sonde or tool 10 that is adapted to be suspended in and moved through a well bore 12 by an armored cable 14. The well bore 12 is illustrated as containing a borehole fluid 16 and as including a steel casing 18 and surrounding cement annulus 20. Although no tubing is shown in the borehole, the tool 10 may if desired be sized for through-tubing use.

The downhole tool 10 includes a pulsed neutron generator 22 and two radiation detectors 24 and 26 that are located at different spacings from the neutron generator 22. The detector 24 spaced closest to the neutron generator is designated the "near" detector and the detector 26 located farther from the neutron source is designated the "far" detector. For the purpose of the present invention, the neutron generator 22 is preferably of the type which generates discrete pulses of fast neutrons, e.g. 14 Mev., and may for example be of the types described in more complete detail in U.S. Pat. No. 2,991,364 to C.

Goodman, dated July 4, 1961, and U.S. Pat. No. 3,546,512 to A. H. Frentrop, dated Dec. 8, 1970. Operation of the neutron generator 22 is controlled in part by a neutron generator control circuit 30, and this circuit may also be of the types described in the aforementioned patents. The detectors 24 and 26 may be of any construction suitable for the detection of the thermal neutron concentrations in the surrounding earth formation and, to that end, may be of the thermal neutron sensitive type, e.g. helium 3 filled proportional counters, or of the gamma ray sensitive type, such as thallium-activated sodium iodide detectors. In the preferred embodiment, the detectors 24 and 26 preferably comprise sodium iodide scintillation detectors and, in this respect, will be understood to include the usual photomultiplier tubes, photomultiplier high voltage supplies, and amplifier-discriminators (not shown). It will also be understood that other downhole power sources (not shown) are provided as required to drive the neutron generator 22 and other downhole circuits. Power for the well tool 10 is supplied over the cable 14 from a surface power supply (not shown), as is conventional.

Output pulses from the near detector 24 and the far detector 26, representative of the concentration of thermal neutrons in the irradiated formation, are applied to signal gating circuits 32. The signal gating circuits 32 are controlled by gate timing circuits 33, which also control the operation of the neutron generator control circuit 30. From the signal gating circuits 32 the detector signals are counted and stored in memory circuits 35 and thence, under control of telemetry logic circuits 37, are applied to downhole telemetry circuits 34 for transmission to the surface over the cable 14. The overall operation of the neutron generator control circuit 30, the signal gating circuits 32, the gate timing circuits 33, the memory circuits 35, and the telemetry circuits 34 is described in detail hereinafter in connection with FIGS. 3-12.

The downhole telemetry circuits 34 may be of any known construction for encoding, time division multiplexing, or otherwise preparing the data-bearing signals applied to them from the telemetry logic circuits 37 and for impressing such data on the cable 14. At the earth's surface, the data-bearing signals from the near and far detectors 24 and 26, respectively, are amplified, decoded, demultiplexed and otherwise processed as needed in the surface telemetry circuits 36, which may also be conventional. The telemetry circuits 34 and 36 also include circuits for the receipt and trasmission, respectively, of command messages from the surface for the purpose of selection of the scale factor value F to be used, as is described more fully hereinafter. Suitably, therefore, the circuits 34 and 36 comprise a bi-directional data telemetry system useful for these purposes and having a 10 K bit per second upward data rate.

Following circuits 36 the near-detector and far-detector signals are separately counted in signal counting circuits 38 to acquire the thermal neutron decay curve data over a desired accumulation interval $\Delta t$. Upon termination of the data accumulation time $\Delta t$, which may be selected, for example, to correspond to a desired interval of depth in accordance with logging speed of the tool, the count rate data accumulated in the signal counting circuits 38 and transferred to buffers 40 and the signal counting circuits 38 are reset to zero.

From storage 40, the count rate data are processed in a computer 42, which suitably comprises a microprocessor or, alternatively, a general purpose digital computer such as that manufactured by Digital Equipment Corporation, Maynard, Massachusetts, under the designation PDP-11. As is described more fully hereinafter, the computer 42 processes the count rate data from the respective detectors to develop various desired outputs, including, for example, the decay time constants $\tau_N$ and $\tau_F$ for the near and far detector, respectively, the corresponding macroscopic capture cross sections $\Sigma_N$ and $\Sigma_F$, and various other selected outputs such as a ratio (N/F) of count rates from the near and far detectors, background counting rates ($B_N$ and $B_F$) from the respective detectors, and the net count rates from certain time gates, e.g. $N_8$ and $F_8$, for both detectors. All of these outputs may be recorded in conventional fashion as a function of tool depth in a recorder 44. The usual cable-following mechanical linkage, indicated diagrammatically at 46 in FIG. 1, is provided for this purpose. As is illustrated by line 48 in FIG. 1, the computer 42 transmits an appropriate scale factor command signal to the surface telemetry circuits 36 for transmission downhole to the gate timing control circuits 33 for real time adjustment of the timings and durations of the detection gates for the near and far detectors 24 and 26 and, if desired, for the duration and repetition rate of the neutron bursts as well.

In the graphical representation of FIG. 2, three decay curves 50, 52 and 54 represent, respectively, the variation with time of the logarithmic counting rate of thermal neutron capture gamma rays following irradiation of earth formations having short, medium and long decay times (rates of decay) of thermal neutron concentration. For purposes of comparison, the curves 50, 52 and 54 are shown as normalized to approximately the same peak counting rate although, as will be appreciated, this is not normally the practice. The variable tailing portion 56 of each curve represents background, and this too has been shown as being at approximately a constant level of intensity for purposes of illustration.

As is well known, the slope of the thermal neutron decay curve for a formation is indicative of the thermal neutron decay time constant $\tau$ of the formation, and it is a feature of the present invention that the decay curve, and thus $\tau$, may be more precisely detected or measured than has been possible heretofore. In furtherance of this object, sixteen discrete time intervals or gates $G_1$–$G_{16}$ are provided between successive neutron bursts. As illustrated in FIG. 2, the gates $G_1$–$G_{16}$ constitute a sequence of discrete time gates, which sequence begins after a finite time delay following the termination of the preceding neutron burst and extends over the entire, or substantially the entire, remainder of the interval between neutron bursts. Advantageously, though not necessarily, the gates are contiguous in time. The purpose of the time delay between the preceding neutron burst and the beginning of the gating sequence is to permit gamma rays emanating from the immediate borehole environment, e.g. borehole fluid, casing, cement annulus, tool housing, etc., to die out before detection of the count rate data from the formation is commenced. As indicated in FIG. 2, the discrete time gates $G_1$–$G_{16}$ are divided into four groups I, II, III and IV of four gates each, i. e. times gates $G_1$–$G_4$ comprise gate group I, time gates $G_5$–$G_8$ comprise gate group II, times gates $G_9$–$G_{12}$ comprise gate group III, and time gates $G_{13}$–$G_{16}$ comprise gate group IV. Within each gate group, the discrete time gates are of equal duration. Hence, each of gates $G_1$–$G_4$ has the same duration, e.g. 25 microseconds ($\mu$s), and, similarly, the individual time gates of each of gate groups II, III and IV are also of equal duration. However, the duration of the time gates increases progressively from gate group to gate group in the sequence. The increase is incremental, i.e. by a finite factor, and preferably the degree of increase is a multiple of the time gate duration of the next preceding gate group. A multiple of two has been found advantageous. Thus, the duration of the discrete time gates $G_5$–$G_9$ in gate group II is preferably twice the duration of the discrete time gates $G_1$–$G_4$ in gate group I, i.e. 50μs. The duration of the individual time gates $G_9$–$G_{12}$ in gate group III is then twice the duration of the individual time gates $G_5$–$G_8$ in gate group II, i.e. 100 μs, and the duration of the individual time gates in gate group IV is twice that of the Group III gates, i.e. 200 μs. It will be understood that either or both the specific durations of the gates within each group and the amount of the increase in gate durations between groups may be varied as desired from the values shown. Also, both the number of gate groups and the number of discrete time gates within each gate group may likewise be varied from the four-four scheme shown in FIG. 2.

By thus employing narrow gates early in the gating sequence and wider gates later in the gating sequence, the narrowest gates are concentrated in the early regions of the thermal neutron decay curves 50, 52 and 54 where the rate of change in counting rate is the greatest. Further, not all of the time gates need be included in the $\tau$ computation, but rather only those containing significant decay signal. Thus not only is a degree of data compaction achieved through the use of detection time gates of variable duration with time after the neutron burst, but greater precision is provided by excluding from the $\tau$ computation counting rates from time gates which are subject to undue statistical variation, such as the later gates in short $\tau$ formations. As described more fully hereinafter, the particular gates to be employed in computing $\tau$ are selected on the basis of a prior measurement of $\tau$ during the same logging run, and are those gates which have been determined empirically to give the minimum statistical variation in the measured value of $\tau$ over a finite $\tau$ range spanning the previously measured value.

It has been found, in accordance with the invention, that in addition to providing time gates $G_1$–$G_{16}$ which increase in width as a function of time after the neutron burst, even better results are obtained by providing for selected, incremental adjustment of the durations of the discrete time gates $G_1$–$G_{16}$, and, if desired, also of the durations and repetition period of the neutron burst and the duration of the discrete time delay between the end of the burst and the beginning of the gating sequence, as a function of a previously measured value of $\tau$. The object is to so position the gates $G_1$–$G_{16}$, neutron burst, etc., that the counting rates in all of the gates used in the $\tau$ computation, i.e., the early gates, the mid-range gates and later gates as the case may be, will be sufficiently high for reliable statistical precision in the $\tau$ measurement. It is desirable, therefore, in effect to shift the time placement of the detection time gates, neutron burst, etc. as the $\tau$ of the formation, and thus the rate of decay of the thermal neutron concentration curve, varies. Such time interval adjustment is accomplished by multiplying each time interval to be adjusted in duration by a common selected value of a finite number of discrete scale factor values F. This is illustrated in FIG. 2, where the duration of the neutron burst is shown as F×200 μsec, the duration of the delay as F×200 μsec, the duration of each of gates $G_1$–$G_4$ as F×25 μsec, and so on. As also shown in FIG. 2, the next succeeding neutron burst is preferably contiguous in time with the end of time gate $G_{16}$, whereby not only the duration of the neutron burst may be adjusted by the scale factor value F but also the repetition period between successive neutron bursts, as indicated by the value F×1900 μsec. Hence, it will be appreciated that by changing the value of the scale factor F the counting rate times for the various gates may be uniformly changed relative to the neutron burst in a manner to optimize the detection of the thermal neutron concentration decay in the particular formation at hand. That is to say, by selection of the scale factor F the individual gates $G_1$–$G_{16}$ may be expanded or contracted along the time base of the thermal neutron decay curve as the rate of change of the curve, and thus $\tau$, varies.

By providing for a finite number of incremental changes in the widths of the detection time gates, it is possible to locate the time gates properly relative to the portion of a thermal neutron decay curve that is most representative of decay of the thermal neutron concentration in the earth formation, namely the straight line portion of the curve appearing on a semi-log plot such as that of FIG. 2, so as to maximize counting rates within the gates and thereby improve precision in the measurement of the $\tau$, while at the same time avoiding the necessity for the infinitely variable electronic gates used in prior logging tools. It has been found, for instance, that if three or less F values are used, the later gates used to compute $\tau$ include too much background. This results in greater statistical uncertainty, necessitates measurement of background over unduly long accumulation periods, and requires a separate background computation for nearly all $\tau$ computations. These deficiencies can be largely, if not entirely, eliminated by use of a higher number, e.g. 5 or 6, of scale factor values F. Generally the more incremental values of the scale factor F provided, the greater the statistical reliability achieved. On the other hand, tool complexity increases with increased numbers of scale factor values. Accordingly, it has been determined in accordance with the invention that 4 incremental values of F will afford improved statistical performance over the full $\tau$ range of interest, commensurate with a minimum of tool complexity.

The amount of incremental change between F values should be selected, in conjunction with the specific durations assigned to the gates in gate groups I, II, III and IV, to enable accurate detection of the decay curves over the full range of $\tau$'s expected to be encountered in the earth formations, e.g., from <50 μsec to <600 μsec. For the gate widths of 25 μsec, 50 μsec, 100 μsec and 200 μsec shown in FIG. 2, it is preferred in accordance with the invention to change F by increments of $\sqrt{3}$. The preferred values of F, therefore, are $1/\sqrt{3}$, 1, $\sqrt{3}$ and 3. Also, as described hereinafter, incrementing F by a factor of $\sqrt{3}$ affords circuit advantages in implementing the F factor procedure in the logging tool.

In order to avoid changing F merely as a result of statistical variation in the measured value of $\tau$, the criteria for determining whether the F value need be changed, based on the current measurement of $\tau$, are established such that there is an overlap between adjacent $\tau$ ranges for which either of the two F values associated with those ranges is appropriate. For the exemplary case of $F=1/\sqrt{3}$, 1, $\sqrt{3}$ and 3, suitable criteria for changing F based on a new $\tau$ measurement are:

TABLE I

| $F_{old}$ | $\tau_{new}$ | Change F to |
|---|---|---|
| $\frac{1}{\sqrt{3}}$ | >120 μsec | 1 |
| 1 | >210 μsec | $\sqrt{3}$ |
| $\sqrt{3}$ | >365 μsec | 3 |
| 3 | <285 μsec | $\sqrt{3}$ |
| $\sqrt{3}$ | <165 μsec | 1 |
| 1 | <95 μsec | $\frac{1}{\sqrt{3}}$ |

These criteria permit the use with τ's within the range of from 95 μsec to 120 μsec of F values of either $1/\sqrt{3}$ or 1, within the range of from 165 μsec to 210 μsec of F values of either 1 or the $\sqrt{3}$, and within the range of from 285 μsec to 365 μsec of F values of either $\sqrt{3}$ or 3. Generous overlap regions are thereby provided within which F need not be changed from the previous value. This avoids the "jitter" sometimes encountered in gating control in the prior art infinitely-variable gate tool.

At the beginning of each logging run, or where a previously measured value of τ is otherwise unavailable, the initial scale factor F is set based on fictitious τ, e.g. F=1 for τ=200 μsec. The tool will then automatically change F in accordance with the appropriate criteria, e.g. those of Table I, as the currently measured value of τ changes in the course of the run. Before discussing the procedures for computing τ and thereafter for using the new τ value to determine whether or not a change in the scale factor value F is required, reference may be made to FIGS. 3-12 of the drawings where the manner in which the change in F value and the consequent change in the time durations of the time gates $G_1$-$G_{16}$, neutron burst, etc., are implemented in the downhole tool 10 is shown.

Figure 3:
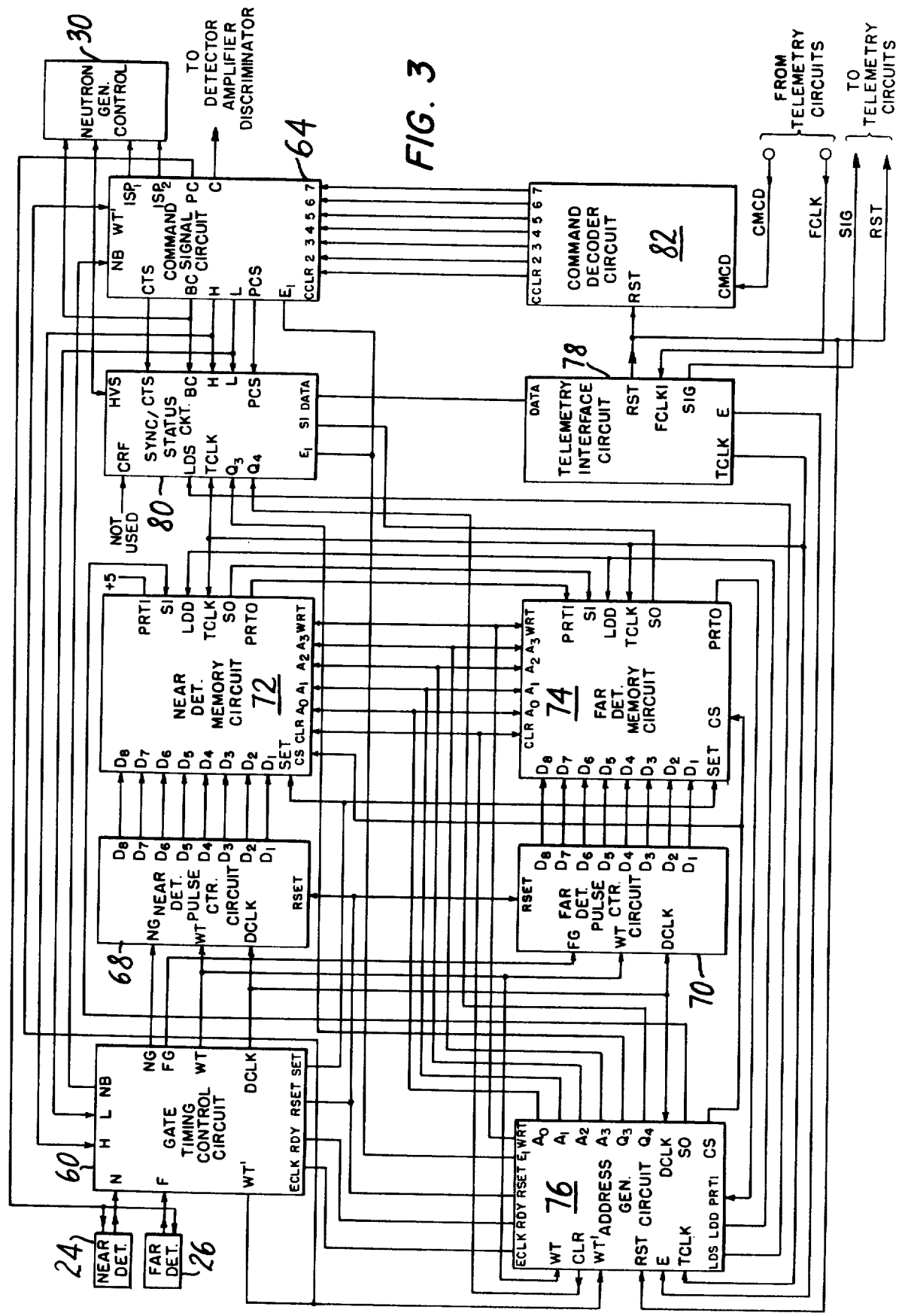
FIG. 3 is a block diagram of the downhole control, gating, memory and telemetry circuits of FIG. 1.

FIG. 3 is a block diagram showing the interconnections between the neutron generator control circuit 30, the signal gating circuit 32, the gate timing control circuit 33, the memory circuits 35, and the telemetry logic circuits 37. The interface between these circuits and the telemetry circuits 34 is also indicated. When the tool is powered-up to begin a run the inputs H and L to the gate timing control circuit 60, which as illustrated combines the circuits 32 and 33 from FIG. 1, are automatically set equal to logic 0. The timing control circuit 60 generates four discrete clock frequencies, each corresponding to one of the scale factor values $F=1/\sqrt{3}$, 1, $\sqrt{3}$ and 3. By changing the logic state of the H and L inputs, selection may be made of the particular frequency, and hence F value, that is to be used. It is assumed here that the logic state 0 corresponds to $F=1$. As described more fully hereinafter in connection with FIG. 6, the output frequency signal is then sent to a series of scalers, i.e. counter/divider circuits, and decoders within circuits 60 and is used to generate all of the timing signals for controlling the operation of the neutron generator 22 and the gating of the near and far detectors 24 and 26.

Thus, the timing circuit 60 produces a neutron burst signal NB that is applied to a command signal circuit 64, which in response thereto generates two ion source pulses ($ISP_1$ and $ISP_2$) that drive the neutron generator control circuits 30 (see also FIG. 1) thus causing the neutron generator 22 to produce bursts of neutrons of the desired duration and repetition rate. The detectors 24 and 26 are preferably blanked during and immediately following each neutron burst to isolate the downstream electronics against excessively huge instantaneous count rates. To that end, the timing generator 60 also generates an appropriate blanking pulse to block the detector outputs for a specific period, e.g., twice the duration of the burst. This is described in more detail in connection with FIG. 6.

The timing gate signal generated by timing generator 60 is denoted DCLK, and this signal is used to gate the detectors in accordance with the regime of FIG. 2. In general, this is done by supplying four frequencies related to each other by a factor of two to a multiplexer under the control of a count-by-four circuit. The multiplexer output is supplied to the counter so that four pulses of the highest frequency are passed through the counter before it switches to pass four pulses of a frequency half that of the highest frequency, until all of the timing gate signal, DCLK, is generated. The timing gate signal DCLK in turn creates memory control pulses WT, SET, and RDY for use elsewhere in the system. The manner in which the DCLK, WT, SET and RDY signals are generated is explained in detail with reference to FIG. 6.

The gated near and far detector signals, NG and FG, are supplied to near detector pulse counter circuit 68 and far detector pulse counter circuit 70, repectively. In these circuits, the pulses from each detector for each gate period $G_1$-$G_{16}$ are counted and a binary number representing that value is transferred in parallel to near and far memory circuits 72 and 74. Each pulse counter circuit actually has two counters. While one of the counters is counting the pulses in one time gate, the other is transferring the results of the previous count to the memory. Two counters are necessary because the time gates are contiguous and there is not enough time for one counter to do both operations. A typical detector pulse counter circuit is shown in more detail in FIG. 7.

Each of the memory circuits 72 and 74 store sixteen 8-bit words which represent the accumulated count for each time gate $G_1$-$G_{16}$ over a number of neutron irradiation intervals. This is done by addressing the memories via an address generator circuit 76 so that the previous value of the accumulated counts for the time gate in question is presented at the input. The memory output is then added to the current count for that gate and the result is again stored in the memory at the address for that time gate. The manner in which the address generator 76 controls the memory circuits is discussed in more detail in connection with FIGS. 8 and 9.

At a predetermined time a signal, FCLK, from the telemetry circuits 34 informs the tool that the accumulated counts for the sixteen gates $G_1$-$G_{16}$ are to be sent uphole. The FCLK signal is received in telemetry interface circuit 78, which generates an E signal and a TCLK signal that are applied to the memory address generator 76 for use in generating signals LDD in address generator circuit 76 that are in turn applied to the memory circuits 72 and 74 to effect transfer of the contents of each memory location, along with generated parity bits, into parallel-to-serial shift registers (not shown in FIG. 3). The TCLK signal then causes the data to be serially shifted from near memory circuit 72 through far memory circuit 74 so that the far detector count rate data for each gate is placed in front of the near detector data for that gate. This string of data is then passed through sync/status circuit 80 which positions a 4-bit sync code and status information word at the beginning of the information to form the DATA signal. The DATA signal is in the form of a binary signal, arranged according to FIG. 10, which is sent to the telemetry interface circuit 78 and thence as signal SIG to the telemetry circuits 34 for transmission uphole. In this respect, the interface circuit 78 functions primarily to make sure that the telemetry circuits 34 are ready to receive the data before it is sent. The operation of sync/status circuit 80 and telemetry interface circuit 78 are set forth more precisely with respect to FIGS. 11 and 12 below.

As described hereinafter, when the count rate data is received uphole the computer calculates $\tau_N$ and if it falls outside the limit for $F=1$ according to Table I, a two bit binary code to change the scale factor is generated. There are four commands that specify the scale factor and three other commands making a total of seven. The scale factor commands result in the generation of H and L signals in the command signal circuit 64 which, as aforementioned, are sent to the timing generator 60 to change the scale factor. The available commands are listed in Table II.

TABLE II

| COMMAND | H.L.CODE | F | REMARKS |
|---|---|---|---|
| 01 | 00 | 1 | Always |
| 05 | 01 | $\frac{1}{\sqrt{3}}$ | Always |
| 06 | 10 | $\frac{1}{\sqrt{3}}$ | If the previous F is 1 |
| 05+06 | 11 | 3 | If the previous F is $\sqrt{3}$ |
| 02 | — | — | Positive plateau check |
| 03 | — | — | Negative plateau check |
| 04 | — | — | Calibration test |
| 01-07-06-01 | — | — | Neutrons on |

Figure 4:
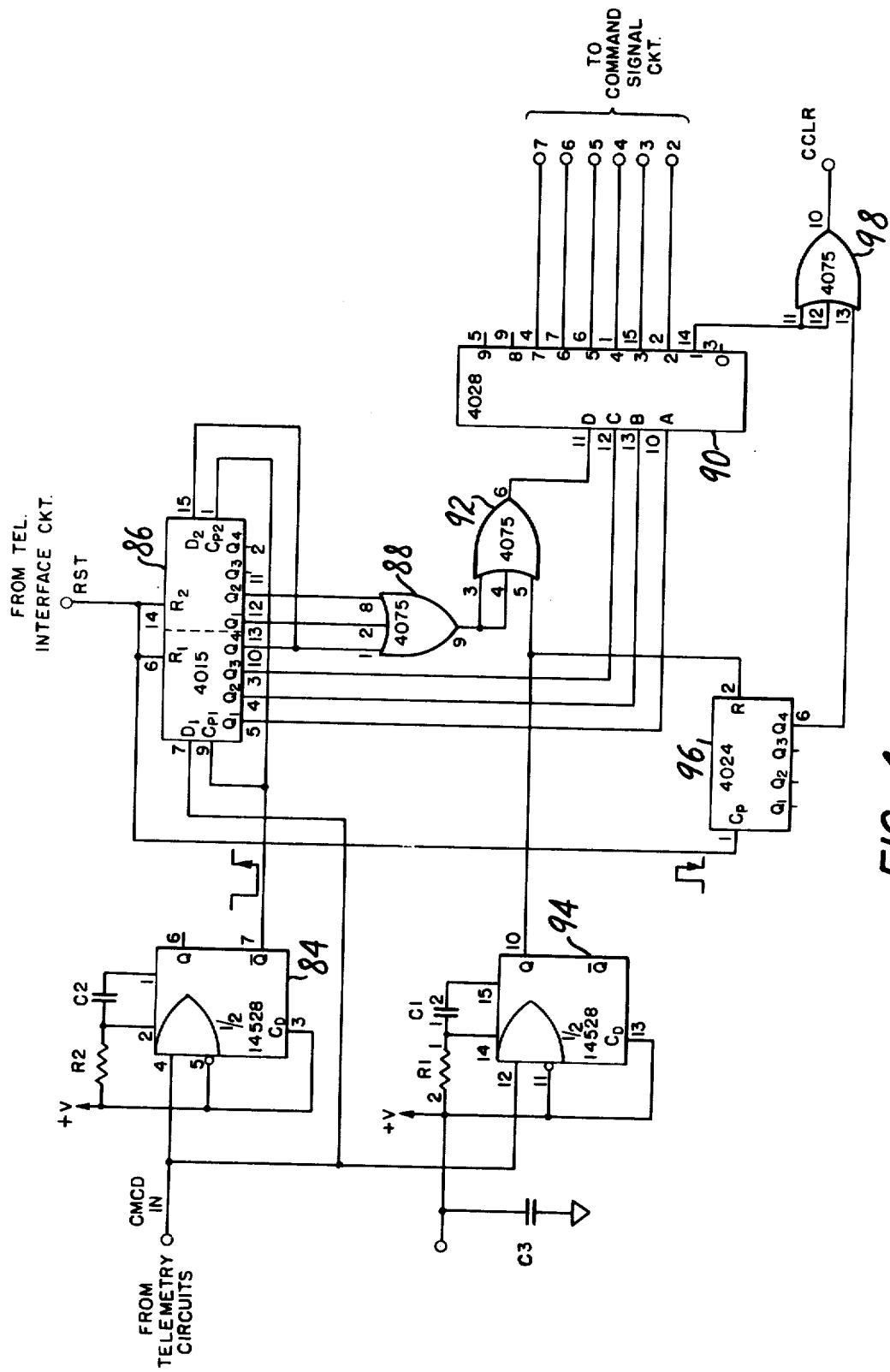
FIG. 4 is a schematic view of the command signal decoder of FIG. 3.

With reference again to FIG. 3, the binary coded command signals CMCD are received from the telemetry circuits 34 by the command decoder circuit 82 (FIG. 4). As indicated in Table II, the tool can be commanded to perform certain tests, e.g. plateau check or calibration test, in addition to changing the F value. It can also be commanded to bring the neutron generator to a ready state, requiring only the NB signal to initiate a burst. In the decoder circuit 82, the command signal is analyzed and the appropriate output, i.e. 2 to 7 or CCLR, is activated. The command lines all go to command signal circuit 64, wherein the signals to carry out the command are generated. This is described in detail in connection with FIG. 5.

In order to demonstrate the detailed working of the various circuits depicted in FIG. 3, it can be assumed that the results of the first $\tau$ calculation resulted in a value of $\tau$ less than 95 μsec. From Table I it can be seen that the uphole computer 42 will require a change in scale factor from $F=1$ to $F=1/\sqrt{3}$. Thus the computer will generate the command 06 (binary bits), corresponding to HL code 10, as shown in Table II. It should be noted that in FIGS. 4–9 and 11–12 the numbers in the circuit blocks represent the model numbers of CMOS integrated circuits that can perform the indicated functions. These integrated circuits are available from a variety of manufacturers, including Motorola, Fairchild, National Semiconductor, and others.

FIG. 4 illustrates the details of the command decoder 82. In FIG. 4, the F-command signal from the telemetry circuits 34 is received by a one-shot 84, i.e. a monostable multivibrator, which has a time delay of 250 μsec and which functions to generate a downhole clock signal from the CMCD signal. For this purpose, the CMCD signal is in the form of a pulse width-encoded signal having a positive-going transition at the boundary between each bit, e.g., every 400 μsec. This positive-going transition clocks the one-shot 84 to produce an output clock signal with a positive-going transition in the middle of each bit period. The one-shot transition clocks a shift register 86 which has the CMCD signal applied to its input. Hence if the CMCD signal is low in the bit period a zero is entered in the shift register 86 and a one is entered if it is high. After six clock pulses from the one-shot 84, the serial data in the CMCD signal is available in parallel form at the outputs of the shift register 86. The three most significant bits of the output of register 86 are applied to an OR-gate 88. If any of these three outputs contains a one, it will be passed to the input D of a binary-to-decimal decoder 90 via an OR-gate 92. This enters an 8 into the decoder 90 so as to prevent any output therefrom less than 8. Thus, a bit in one of the higher order places of the CMCD signal indicates an invalid code which is above the legitimate command codes 01 to 07. Accordingly, the command code should not be applied to the decoder 90 until all of the CMCD signal has been entered into the shift register 86. To that end, the CMCD signal is also applied to a re-triggerable one-shot 94 having a nominal pulse duration of 750 μsec, the output of which goes high when the first CMCD pulse arrives and stays there until 750 μsec after the last one arrives. As shown in FIG. 4, this output is also applied to the D input of the decoder 90 through the OR-gate 92 and functions to block the decoder output until the command code has been completely loaded into the shift register 86. When the output of one-shot 94 finally goes low, the decoder 90 decodes the command signal and activates one of its output lines depending on the command code contained in the CMCD signal. In this case it will be output 6 for the command 06 (see Table III). The command remains in the shift register 86 until receipt of a reset RST pulse from the telemetry interface circuits 78.

The RST signal is also applied to a scaler or divider circuit 96. Scaler 96 produces a command clear CCLR signal through an OR-gate 98 upon receipt of eight RST signals without being reset by the output of one-shot 94. Thus if the CMCD pulses stop for some reason the CCLR signal is still generated. The CCLR signal is also generated through the OR-gate 98 by the "1" output of the decoder 90, i.e. an 01 command resets the circuits so as to produce $F=1$.

Figure 5:
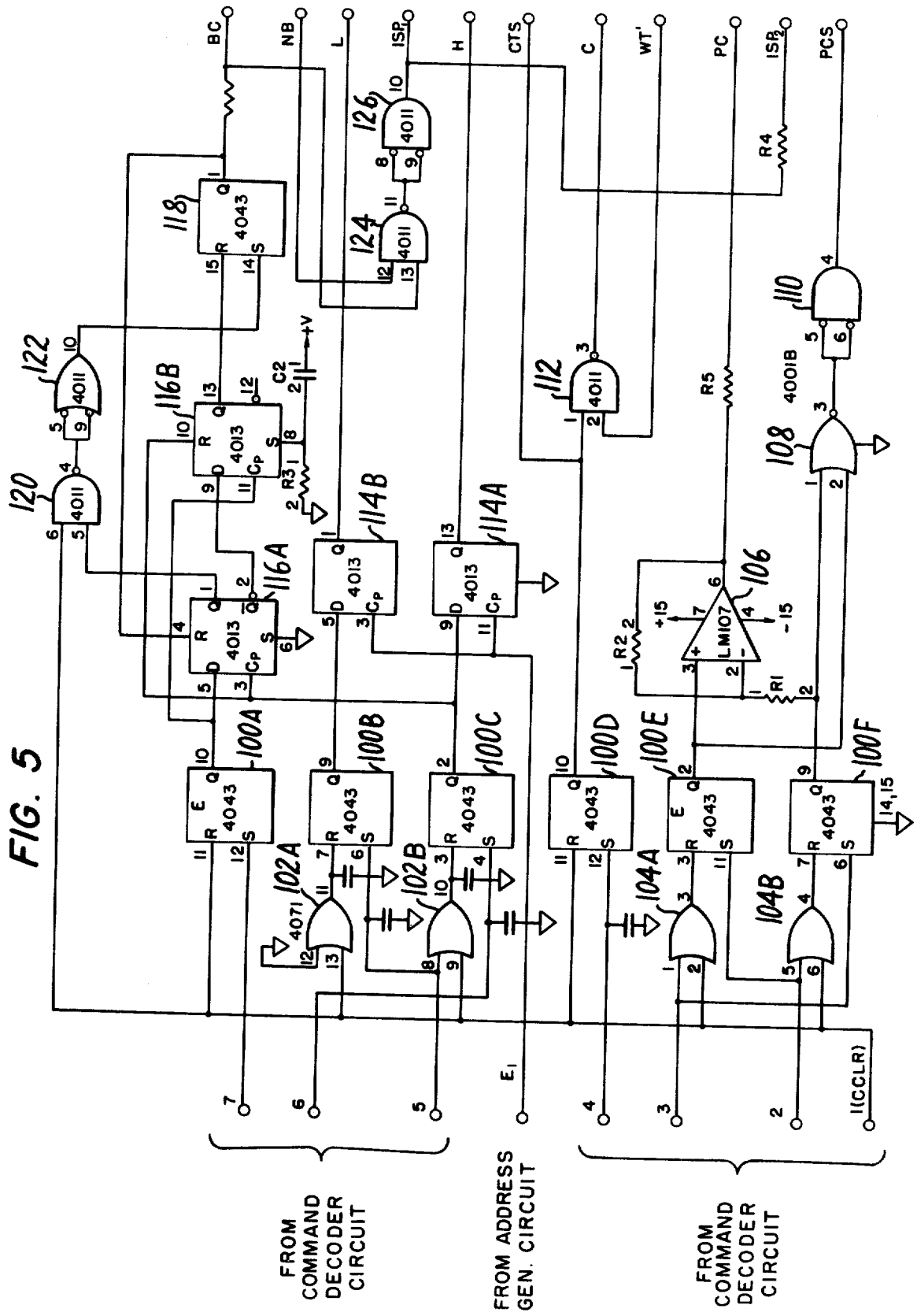
FIG. 5 is a schematic view of an embodiment of the command signal generator of FIG. 3.

The six outputs from the decoder 90 and the CCLR signal are applied to a set of six latch circuits 100A–100F in the command signal circuit 64, shown in detail in FIG. 5. The CCLR signal can reset all of the latches either directly, as in the case of latches 100A and 100D, or through OR-gates 102A–102B and 104A–104B, as in the case of latches 100B–100C and 100E and 100F, respectively. Latches 100E and 100F control a plateau check. When the command 02 is decoded in circuit 82 (see Table II), it puts a high level on the set input of latch 100E and resets latch 100F through OR-gate 104B. This causes the output of these latches to drive the output of amplifier 106 to approximately +15 volts, which voltage is applied to the detector voltage supplies through resistors in order to make the positive plateau check. If command code 03 were received instead, latch 100E would be reset through OR-gate 104A and latch 100F would be set, thus causing amplifier 106 to deliver −15 volts to the detector voltage supplies for the negative plateau check. In the case where the command code is 01, a CCLR signal is created, as described in connection with FIG. 4, and this signal resets both latches 100E and 100F causing the amplifier 106 output to be zero. The outputs of latches 100E-100F are also applied to NOR-gate 108, which supplies through inverter 110 a plateau check status signal, PCS, to the sync/status circuit 80 whenever either a positive or negative plateau check is being done.

The command code 04 sets latch 100D, thereby turning on the calibration tests by allowing WT' pulses from the timing generator circuit 60 to pass through NAND-gate 112. The output C of gate 112 goes to the amplifier inputs of both detectors. During the calibration test, one count per detection gate cycle is added to each of the 16 gate channels for both detectors. If detector background is low (i.e. the tool is on standby) the test counting rates in all gates should be close to the same. The output of latch 100D is the calibration test status signal, i.e. CTS, and it also is applied to the sync/status circuit 80.

The latches 100B and 100C control the scale factor F in response to commands 01, 05 and 06. The outputs of these latches go to a pair of D flip-flops 114A and 114B which are clocked by an $E_1$ pulse from the address generator circuit 76. The outputs of the flip-flops 114A and 114B are the H and L lines which go to the timing generator circuit 60 (see FIG. 3) to control the selection of time operating frequency and hence the scale factor F. For the assumed case of a command code of 06, it is known from Table II that the H, L code should be 10. A high level on input line 6 in FIG. 5 accomplishes this by setting latch 100C and flip-flop 114A. However, command 06 does not reset latch 100B since that command is valid only if F was equal to 1, and F is equal to 1 only with an 01 command which resets all the latches as a CCLR signal and makes both H and L low. Command 05, therefore, sets latch 100B and resets latch 100C through OR-gate 102B. This is necessary because that scale factor change does not depend on the previous value of F. (See Table II) The capacitors to ground on the latch inputs prevent them from being triggered by arcs in the neutron generator.

As indicated in Table II, the process of turning on the neutron generator 22 requires that the sequence of commands 01-07-06-01 be received by the command signal circuit 64. The first 01 command initializes the status of the latches 100A-100B and flip-flop 116A by resetting all of them, flip-flop 116B not being reset. The 07 command sets latch 100A, thereby connecting a high signal to the D input of flip-flop 116A. When this is followed by an 06 command which sets latch 100C, the high input on flip-flop 116A is clocked in that flip-flop, making its Q output high and its $\bar{Q}$ output low. The output of latch 100C also resets flip-flop 116B. When the final 01 command is decoded, a set pulse reaches latch 118 via NAND-gate 120 and inverter 122 because flip-flop 116A is set. The output of latch 118 resets flip-flop 116A, closes NAND-gate 120 and ends the set pulse to latch 118. With latch 118 set, neutron burst pulses NB from the timing generator circuit 60 can pass through NAND-gate 124 and inverter 126 to form the ion source pulses $ISP_1$ and $ISP_2$ (see FIG. 5) which drive the neutron generator control circuit 30.

As the beam current in the neutron source rises, a relay in its control circuit closes. This connects a supply voltage to the output line BC of the latch 118 and makes it impossible to turn off the neutron source without turning off the tool power. It can be seen that flip-flop 116B holds latch 118 in the reset condition until the proper time. Also, the set input to flip-flop 116B is activated when power is first applied to the tool because it is connected to the +voltage through a capacitor. This capacitor and a resistor will pull the set input low to flip-flop 116B after the power has been on for about 10 seconds.

Figure 6:
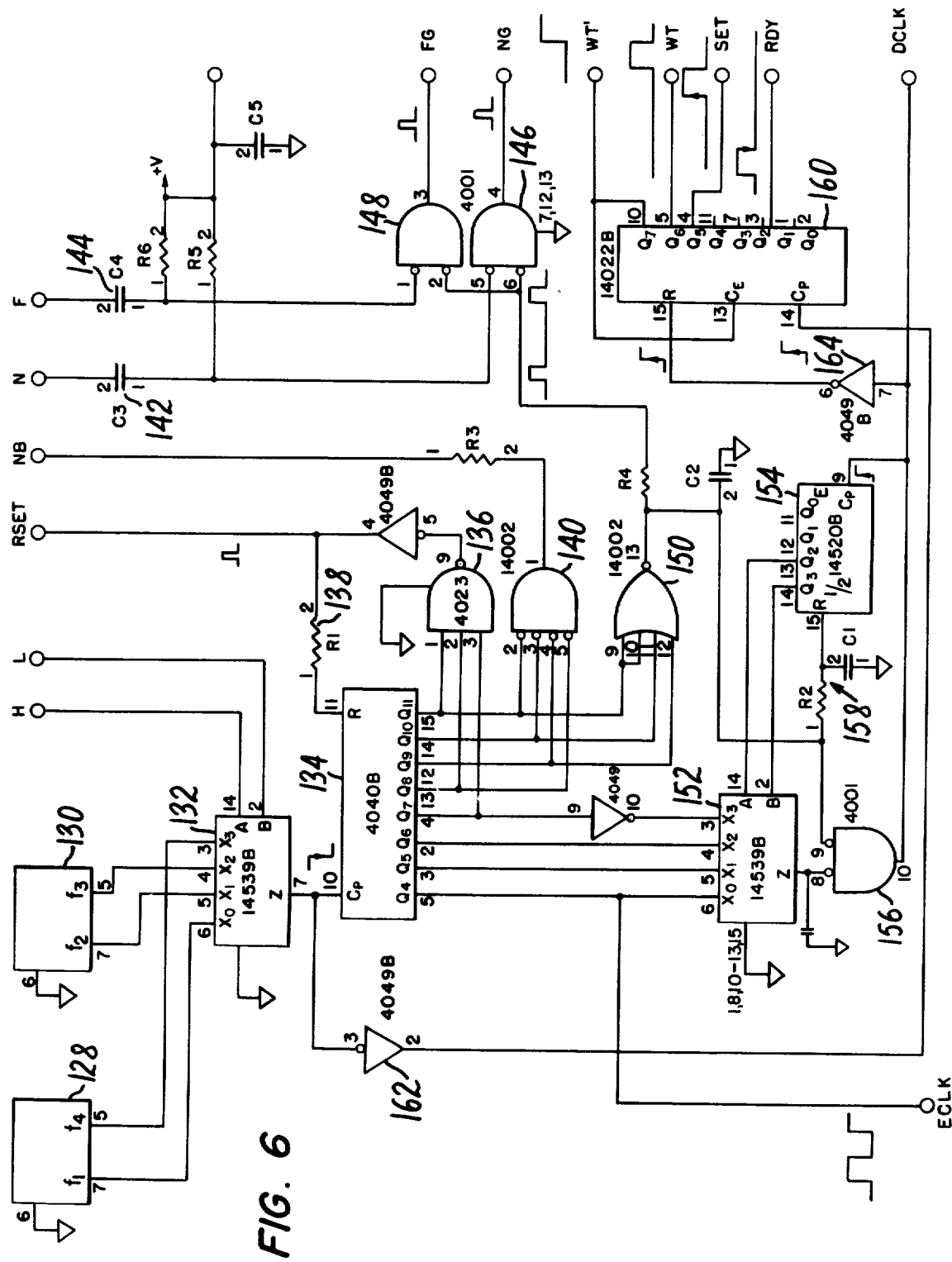
FIG. 6 shows the details of the timing generator of FIG. 3.
Figure 7:
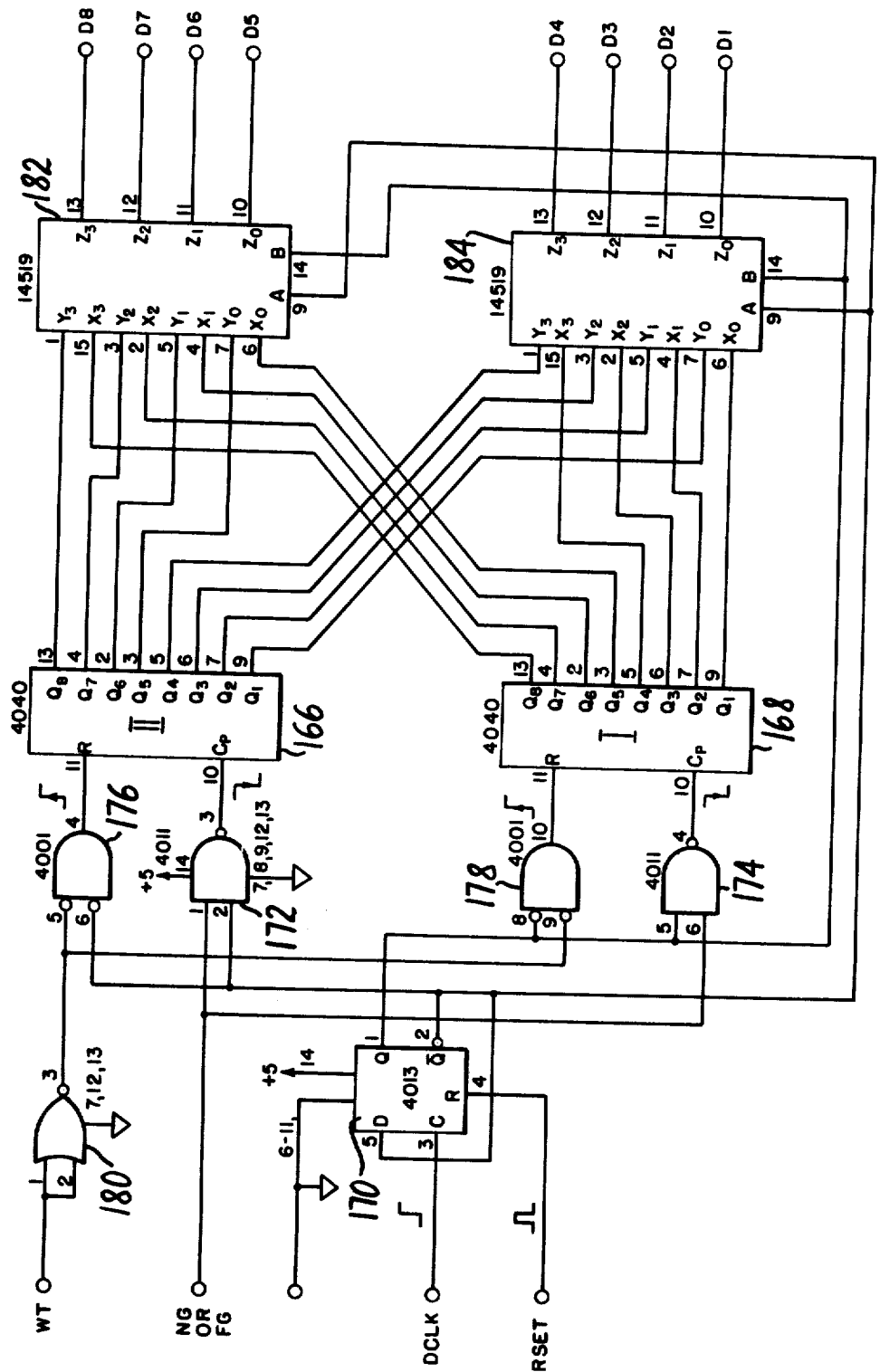
FIG. 7 depicts in detail the near (or far) detector pulse counter circuit of FIG. 3.

With reference now to FIG. 6, two crystal oscillators 128 and 130 in the timing circuit 60 have divide-by-three scalers built into them. Thus both the crystal frequency and the divided-by-three frequency are available from each oscillator circuit, providing a total of four discrete clock frequencies $f_1$, $f_2$, $f_3$ and $f_4$. According to the invention, each of these frequencies is made to correspond to one of the F values $1/\sqrt{3}$, 1, $\sqrt{3}$ and 3. This may readily be done by selecting the crystal frequency $f_1$ of oscillator 128 such that it is $\sqrt{3}$ times lower than the crystal frequency $f_2$ of oscillator 130. Then divided-by-three frequency $f_3$ from oscillator 130 will be related by a factor of the $\sqrt{3}$ to divided-by-three frequency $f_4$ from oscillator 128, and it may be seen that the frequencies $f_1$, $f_2$, $f_3$, and $f_4$ are separated by the factor $\sqrt{3}$ and that, therefore, they may correspond respectively to the scale factor values F of $1/\sqrt{3}$, 1, $\sqrt{3}$ and 3. The clock frequencies $f_1$-$f_4$ are supplied to a 4-channel data selector or multiplexer 132. The logic levels of signals H and L applied to the inputs A and B of the multiplexer determine which of the four input frequencies is connected to the output of the unit. The operation of multiplexer 132 may be summarized succinctly as follows:

TABLE III

| A | B | Selected Input | Output Freq. | Command | F |
|---|---|---|---|---|---|
| Lo | Lo | $X_0$ | $f_1$ | 01 | 1 |
| Hi | Lo | $X_1$ | $f_2$ | 06 | $\frac{1}{\sqrt{3}}$ |
| Lo | Hi | $X_2$ | $f_3$ | 05 | $\sqrt{3}$ |
| Hi | Hi | $X_3$ | $f_4$ | 05 + 06 | 3 |

In accordance with the invention and as has already been referred to previously, all of the timing waveforms required to operate the neutron generator 22 and the detectors 24 and 26 in accordance with the regime of FIG. 2 are derived in common from the output of the multiplexer 132. Hence, a change in the F value can quite simply be implemented in all the timing circuits of the tool. The actual generation of the various timing signals is achieved by use of a multiplexer clock scaler 134 coupled to the output of the multiplexer 132.

As seen in FIG. 6, when the $Q_8$ and $Q_{11}$ outputs of scaler 134 are high and the $Q_7$ output starts to go high, the RSET pulse is generated in NAND-gate 136 and resets the scaler through resistor 138. This marks the beginning of the neutron burst pulse NB generated in gate 140, which pulse lasts as long as the $Q_8$, $Q_9$, $Q_{10}$, and $Q_{11}$ outputs of scaler 134 are all low. As previously described in connection with FIG. 5, the NB pulse is used in the command signal circuit 64 to generate the ion source pulses $ISP_1$ and $ISP_2$. Returning to FIG. 6, negative pulses (N and F) from the near and far amplifier-discriminators of the near and far detectors 24 and 26 pass through capacitors 142 and 144 en route to gates 146 and 148. There they are blocked during the neutron burst and for an equal time afterwards by the output of NOR-gate 150, whose output is high as long as $Q_9$, $Q_{10}$, and $Q_{11}$ of scaler 134 are all low. When the output of gate 150 goes low, the near and far pulses N and F are allowed to pass to the near detector pulse counter 68 and far detector pulse counter 70, respectively. (see FIG. 3)

The $Q_4$ output of scaler 134 is designated ECLK and is sent to address generator 76. The $Q_4$, $Q_5$, $Q_6$, and $Q_7$ outputs are also used as inputs to a 4-channel data selector or multiplexer 152 to generate the detector gating signal DLCK, which signal has the form shown by gates $G_1$–$G_{16}$ in FIG. 2. The A and B inputs to multiplexer 152 are controlled by the third and fourth stages of a scaler 154. The waveform at the output of gate 150, when high, holds scaler 154 reset and at the same time blocks the output of gate 156, i.e. it holds DCLK low during the neutron burst and the delay period thereafter, as illustrated in FIG. 2. When the output of gate 150 goes low, the reset action on scaler 154 lasts a few more microseconds due to the time constant of the R-C circuit 158 so that scaler 154, which is clocked by DCLK, does not trigger on the first positive edge of DCLK. As long as A and B of the multiplexer 152 remain low, the DCLK looks like an inverted version of $Q_4$ from scaler 134, which has the period T/8. The period T is equal to the duration of the widest gate in the regime of FIG. 2, i.e., 200 μsec for each of gates $G_{13}$–$G_{16}$. This lasts for the first four DCLK cycles counted by scaler 154, thereby generating the first four gating signals of 25 μsec duration each. The $Q_2$ output from scaler 154 then goes high, placing a high level on the A input of multiplexer 152 and results in DCLK being controlled by the $Q_5$ output of scaler 134, with a period T/4 or 50 μsec. At the end of four T/4 cycles as counted by scaler 154, which cycles represent the gating signal for gates $G_5$–$G_8$, the scaler 154 next selects the $Q_6$ output of scaler 134. This output has twice the period of the $Q_5$ output, i.e., T/2, and results in the generation of the gating signals for the 100 μsec gates $G_9$–$G_{12}$. Finally four cycles later, the $\overline{Q}_7$ output of scaler 134 with a period T is selected. When four cycles of $\overline{Q}_7$ are passed, the circuit goes into the blanking period established by gate 150, as aforementioned.

Memory control pulses WT, WT', SET and RDY are generated in a Johnson counter 160 that is clocked by the output of multiplexer 132 via the gate 162. However, these memory control pulses are generated only when DCLK is high ($\overline{DCLK}$ low), since the DCLK signal inverted by gate 164 is applied to the reset input of counter 160. This is done because there is no need for memory pulses during the blanking period. As illustrated in FIG. 6, the RDY signal is the $Q_2$ output of counter 160, the SET signal is the $Q_5$ output, the WT signal is $Q_6$, and the WT' signal is the $Q_7$ output. When the waveform WT' goes high, it blocks further clocking because it is connected to the clock enable input $C_E$ of the counter. Thus, WT' will stay high until the counter 160 is reset the next time $\overline{DCLK}$ goes high.

The near and far detector pulse counter circuits 68 and 70 (see FIG. 3), which receive the gated detector signals NG and FG from the timing circuit 60 (see FIG. 6), are identical. Hence, the operation of only one of these circuits will be described in connection with FIG. 7. The pulse counter circuits each include a scaler 166 that receives detector pulses from the even-numbered gates, $G_2$, $G_4$, etc., and a scaler 168 that receives the pulses from the odd-numbered gates, $G_1$, $G_3$, etc. While scaler 166 is counting, scaler 168 holds its counts until reset by the WT pulse, and vice-versa. By the time the WT pulse arrives, the counts being held have been stored in the memory circuits 72, in the case of the near detector, and 74, in the case of the far detector (see FIG. 3). Flip-flop 170 controls the action in accordance with the DCLK signal. After sixteen DCLK pulses, the RSET signal insures that the flip-flop 170 is in a reset condition to repeat the operation for the next irradiation interval.

The gated detector pulses NG (or FG) are positive and suitably about 0.4 μsec in width. They are directed to NAND gates 172 and 174, which are alternately opened and closed by the $\overline{Q}$ and Q outputs, respectively, of flip-flop 170. Two additional gates 176 and 178 receive WT pulses, following the inversion thereof in gate 180, and are likewise controlled by the $\overline{Q}$ and Q outputs of flip-flop 170. As will be appreciated, when the scaler 166 is being clocked by NG (or FG) signal pulses, it is not reset by WT, but scaler 168 is so reset.

Upon completion of counting for a time gate, the total count accumulated therein appears in parallel form at the Q outputs of the scalers 166 and 168 and is thereafter applied to one of two quad 2-channel data selectors 182 and 184, the A and B inputs of which are driven by the flip-flop 170 such that they select the outputs from whichever scaler 166 or 168 is holding its counts and ignore the outputs from the scaler that is counting. As seen in FIG. 3, the data selector outputs are delivered to the memory circuit 72, for the near detector counts, and to the memory circuit 74, for the far detector counts.

Before discussing the memory circuits, however, it is useful to review the operation of the address generator circuit 76 which controls the memory circuits. This circuit, shown in FIG. 8, must control the storing of the count rate data after it has been detected and the reading out of the data in response to telemetry requests. Although the data storing and the data read operations are asynchronous, the memory where the data is temporarily accumulated must be accessible both for storing new counts quickly at the correct address and for reading out the accumulated counts at another address when required by telemetry. Accordingly, two address scalers are provided to keep track of the separate addresses required for storing and reading and provision is made to give priority to storing new data. The telemetry, then, may read out data between storage operations.

Figure 8:
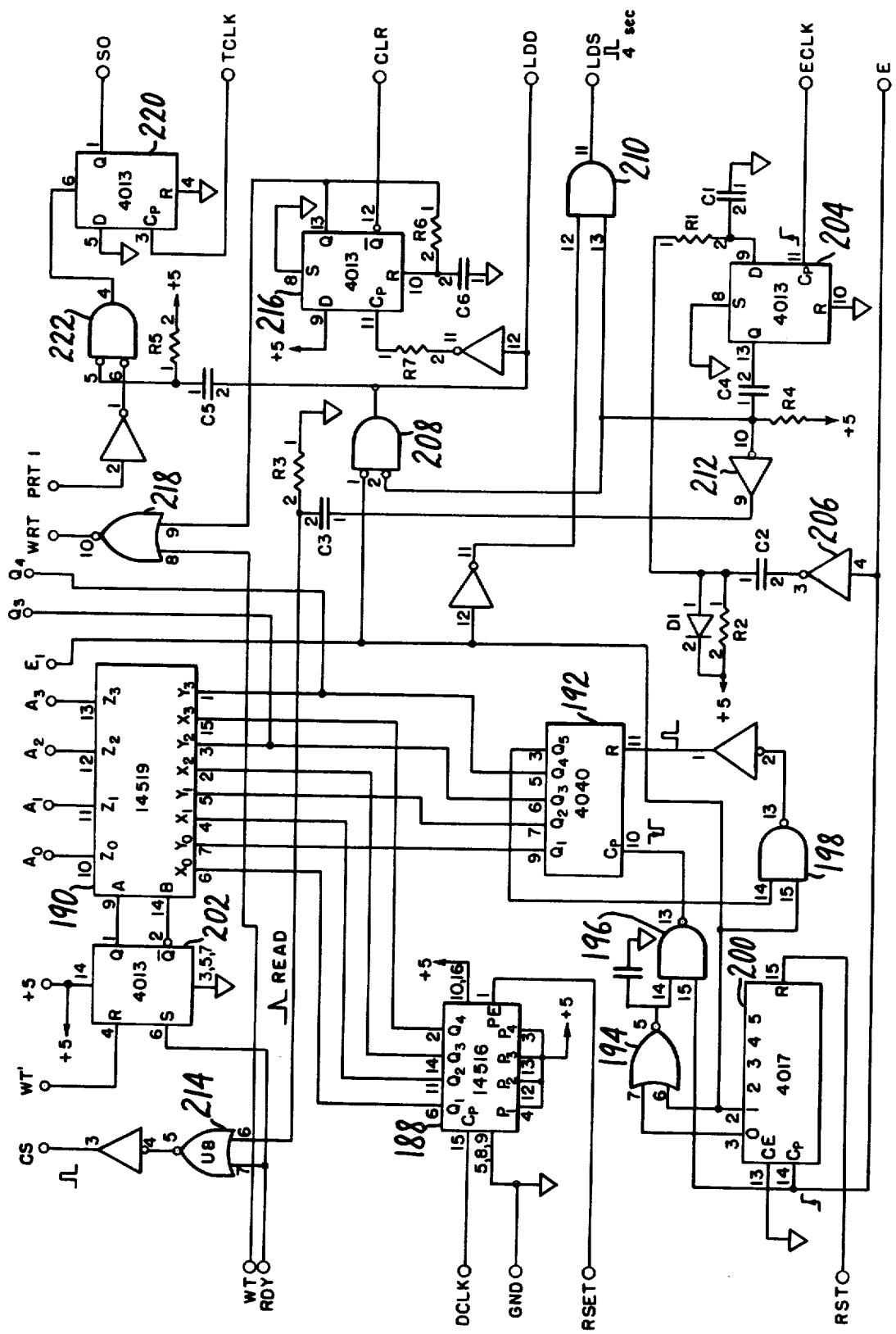
FIG. 8 is a schematic view of the memory address generator of FIG. 3.

In FIG. 8, the RSET pulse from the timing generator circuit 60 initially presets all the outputs of the "store" address counter 188 high and holds them high until the beginning of a new detection interval. The first DCLK pulse at the beginning of a new interval clocks counter 188 to all zeroes, and this is the address where the gate $G_{16}$ counts, from the previous detection interval, are stored while the gate $G_1$ counts in the new interval are being accumulated in one of the detector pulse counter circuits 68, 70 (see FIG. 3). As previously described in connection with FIG. 7, the counts from odd-numbered gates go to one scaler in the counter circuits and those from even-numbered gates go to the other. During the DCLK cycle, one scaler is actively counting while the other is holding the counts from the previous gate so that they can be added to the memory. Thus the $G_{16}$ count for each detector is held in the "even-numbered" scaler for that detector until it is stored in the memory during the next succeeding $G_1$ period. The address fixed in the memory during this store operation is the output of scaler 188, which is passed through a quad 2-channel data selector 190 to the memory circuits. As each DCLK pulse arrives, indicating a new gate, scaler 188 is incremented thereby changing the storage address.

As noted a separate address scaler 192 is provided for telemetry readout. Its clock and reset inputs are controlled by a system of gates 194, 196 and 198 which in turn are controlled by a Johnson counter 200. This is done so that the telemetry address scaler 192 is clocked only for the data words read out, and not for the sync/status part of the information supplied to telemetry. The counter 200 is clocked by all positive-going edges of E and is reset by the telemetry reset signal RST, which should not be confused with the reset RSET from the timing generator 60. The E pulse is generated in the telemetry interface circuit 78 (FIG. 3) and goes positive a desired number of times per telemetry frame, e.g. 5, and is followed by the telemetry reset signal RST. The NOR gate 194 keeps one input of the NAND-gate 196 low until the second time E goes positive in order to prevent the generation of memory address signals while the sync/status words are generated and transmitted. Then the output of gate 194 goes high and stays high for all of the data words in each telemetry frame, e.g. 4 (see FIG. 10), thus allowing counter 192 to be clocked a corresponding number of times per frame to generate the memory read out address. After being clocked 16 times (4 frames) output $Q_5$ of the counter 192 goes high, thereby enabling the output of NAND-gate 198 to go low the next time the "1" output of counter 200, i.e. E signal, goes high. This resets counter 192 through gate 198 and keeps it in step with the E pulses. The $Q_3$ and $Q_4$ outputs of counter 192 control the frame identification bits in the sync/status word and are delivered to the sync/status circuit 80 (FIG. 3).

Flip-flop 202 controls data selector 190 such that the proper address counter, i.e., counter 188 or counter 192, has control of the memory address lines, $A_0$–$A_3$. Flip-flop 202 is set by the RDY signal and reset by WT', both from the timing generator 60. When flip-flop 202 is in the set condition, the data selector 190 selects the "store" address, and when it is in the reset condition, the selector 190 selects the "read-out" address. As can be seen in FIG. 6, the RDY signal is the $Q_2$ output of counter 160 and the WT' signal is the $Q_7$ output. Hence store occurs during one part of a cycle and transmission during the other part.

In addition to controlling the memory address lines, the circuit of FIG. 8 generates the LDS, LDD, READ and CLR pulses. The LDS signal loads sync and status bits into a shift register in the sync/status circuit 80. Shift registers in the memory circuits 72, 74 are loaded with data from memory at selected read-out addresses by the LDD signal. The READ signal causes the memory output to correspond to data at a selected address and the CLR signal sets the memory contents to zero at a selected address. The READ signal starts at the same time as LDD, but is of shorter duration. CLR occurs at the end of LDD. When READ and RDY are mixed together, they become CS (Chip Select). When CLR and $\overline{WT}$ are mixed, they become WRT.

Interference between store and readout are prevented since LDS, LDD, and READ are not generated directly by a positive-going edge of E, but are generated by the first positive-going ECLK edge after E goes positive. The ECLK is applied to the Cp input of flip-flop 204. The D input is normally high, so Q is normally high. When E goes high, it is inverted by gate 206, differentiated by $R_2$ and $C_2$ and coupled to the D input of flip-flop 204 through an RC delay, $R_1$ and $C_1$. When the D input of flip-flop 204 is low, the first positive ECLK edge will make the Q output go low. This output is differentiated by $R_4$ and $C_4$ and is applied to two gates 208 and 210. If the "1" output of counter 200, designated $E_1$, is high, an LDS pulse will appear at the output of gate 210. If $E_1$ is low, there will be an LDD pulse at the output of gate 208. $R_4$ and $C_4$ determine the duration of these pulses. A simultaneous positive pulse occurs at the output of inverter 212, which is then differentiated by $R_3$, $C_3$ to become the READ pulse. The READ pulse and RDY pulse are combined in gate 214 to generate signal CS.

A flip-flop 216, which acts as a one-shot because its Q output is connected to its reset input R through time delay network $R_6$, $C_6$. It triggered by the trailing edge of LDD after the latter is inverted and slightly delayed by a time delay network formed by $R_7$ and the input capacitance at clock input $C_p$ of flip-flop 216. The CLR pulse is taken from the $\overline{Q}$ output of this flip-flop. Its duration is controlled by $R_6$ and $C_6$. The CLR and WT signals are combined in NOR-gate 218 to create the WRT signal.

Flip-flop 220 plays a part in setting the parity bit in each word. It is triggered by the TCLK signal from telemetry interface circuit 78 and is set by the output of gate 222. A PRT I signal from the far memory circuit 74 and the LDD signal control the inputs to gate 222. The operation of this gate and flip-flop 220 will be explained in more detail in connection with the memory circuit shown in FIG. 9.

Figure 9:
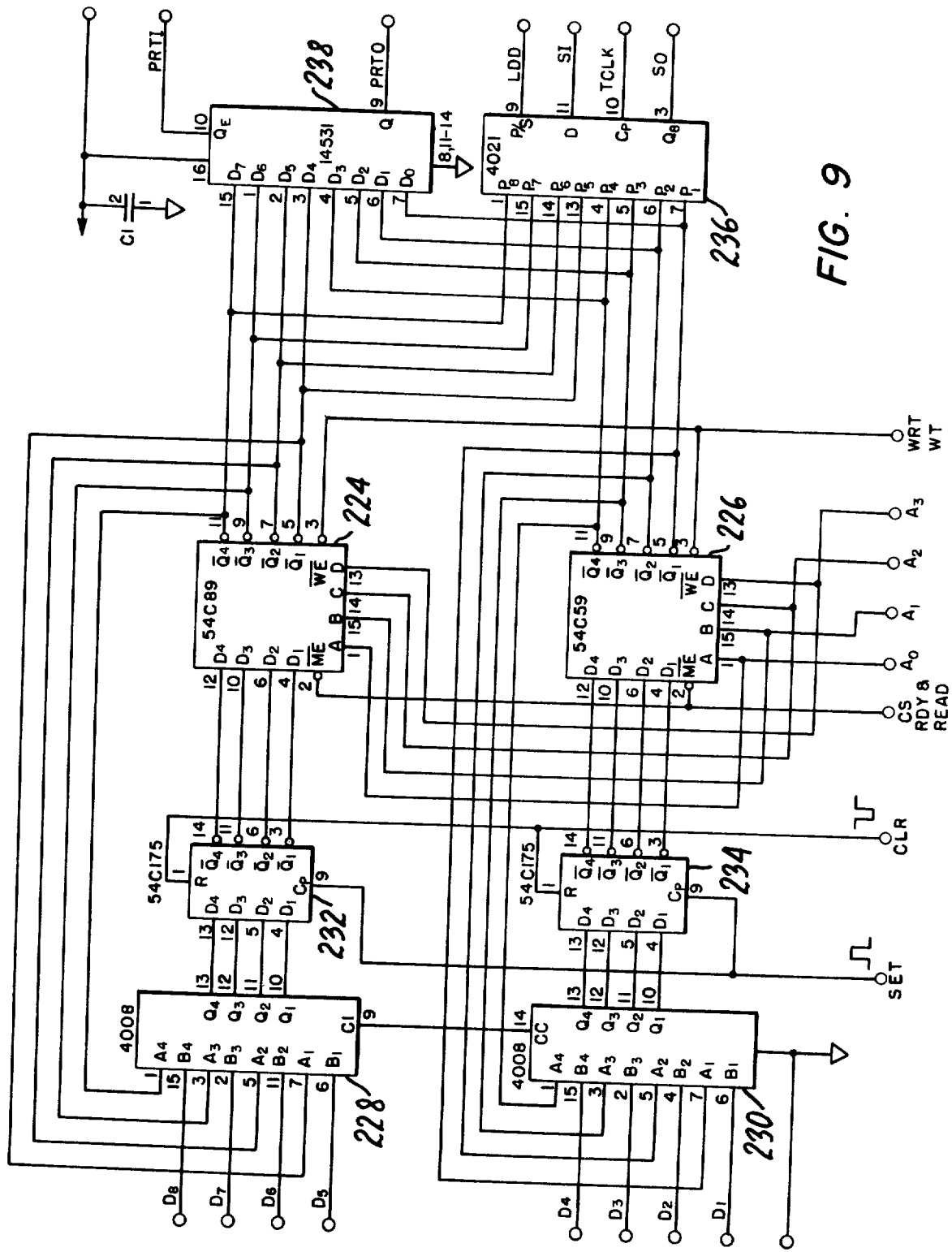
FIG. 9 shows an embodiment of the near (or far) detector memory circuit of FIG. 3.

The memory circuits 72 and 74 are the same and hence only one of them is shown in FIG. 9. Each memory circuit includes two random access memories (RAM) 224 and 226, each capable of storing 4 data bits at 16 different addresses. The address lines $A_0$–$A_3$ for these memories come from the address generator circuit 76, shown in detail in FIG. 8. When read out, the complement of the data appears at the outputs. The outputs of the RAMs 224 and 226 and data inputs from the pulse counter circuits are applied to adders 228 and 230, respectively, which are each able to add two 4-bit binary numbers. When these adders are connected in series as shown, they can add these two 8-bit binary numbers. The result of this addition is stored in Quad D flip-flops 232 and 234. With this arrangement, the complement of the adder 228 and 230 outputs appears at the flip-flop 232 and 234 outputs when the SET pulse from timing generator 60 goes positive. Thus it can be seen that the current gamma count in a particular gate is added to the previous total count for that gate. Memories 224 and 226, therefore, store the total count for each gate for a number of neutron bursts, i.e., over a number of irradiation intervals.

Incoming data from a pulse counter circuit 68 or 70 goes to the $B_1$–$B_4$ inputs of the adders, and the memory 224 and 226 outputs are connected to the $A_1$–$A_4$ inputs. To store new data a succession of RDY-SET-WT pulses is generated. The RDY pulse arrives on the CS line (shared with READ) and the WT pulse is on the WRT line. At the end of RDY, the memories latch on the new address supplied from the address generator 76. The data contained at that address appears at the $\bar{Q}$ outputs of the RAM's 224 and 226 and the binary number it represents is added to the number supplied by the associated pulse counter circuit. After a short delay, the SET pulse latches the sum into the D flip-flops 232 and 234. The SET pulse is followed by the WT pulse which writes the complement of the sum into the memories at the same address. In this connection it should be noted that the memory output is the complement of the number stored.

A shift register 236 is used for parallel-to-serial conversion of the data in the memory, when required by telemetry with the arrival of an LDD pulse followed by the TLCK signal. A parity tree 238 is also provided for generating the parity bit that is part of each gate detector word (See FIG. 10).

Readout for telemetry requires a succession of LDD, READ, and CLR pulses. Data at the desired address appears on the memory output lines at the end of the READ pulse. The READ pulse is overlapped by LDD, which loads this data into the shift register 236. At the end of LDD, the CLR pulse occurs, resetting the D flip-flops 232 and 234 so as to set all the $\bar{Q}$ outputs to 1 and simultaneously supplying a negative pulse on the WRT line so as to write the 1's into the memory. This is the same as clearing that memory address, because the next time it is read out the result will be all zeroes.

FIG. 3 shows how the shift register and parity trees of the near and far memory circuits 72 and 74 are interconnected with each other and also with the SO (Shift Out) output of flip-flop 220 of the address generator circuit of FIG. 8. Both memory circuits 72 and 74 store data from a given detection gate simultaneously and both are read-out at the same time. As shown, the shift registers of the two memory circuits 72 and 74 are connected in series, with the SO output from the near detector memory circuit 72 connected to SI (Shift In) input on the far detector memory 74. The SI input of the near memory circuit 72 comes from the SO output of flip-flop 220 in the address generator 76. This output controls the parity bit. The parity trees 238 in the memory circuits are also connected in series to form a single parity bit for the combined near and far word. The resulting output of the far detector memory parity tree (PRT I) determines whether flip-flop 220 in the address generator will be set by the LDD pulse or will remain zero.

Following LDD, the TCLK signal arrives from the telemetry interface 78 and causes the data to be shifted out. The first serial data bit is the most significant bit from the far memory 74. After the 8 far bits are sent, the 8 near bits are shifted out, followed by the parity bit.

As can be seen from FIG. 3, the data bits from the memory circuits are shifted in series through the sync/status circuit 80 which adds the sync and status bits to the front of the data words. (See FIG. 10) FIG. 11 shows the details of the sync/status circuit with the data words applied to the SI input which leads to NAND-gate 240. The sync/status bits are applied to NAND-gate 242 and these two signals are combined in gate 244 to create the DATA signal output. To generate the sync/status bits the LDS pulse loads the shift registers 246 and 248 with parallel data, which is then shifted out by the TCLK signal while the $E_1$ signal is high. The LDS signal also triggers a flip-flop 250 which acts as a one-shot and resets the scaler 252 that has control of the four "spare" bits at the end of the sync/status word.

Figure 10:
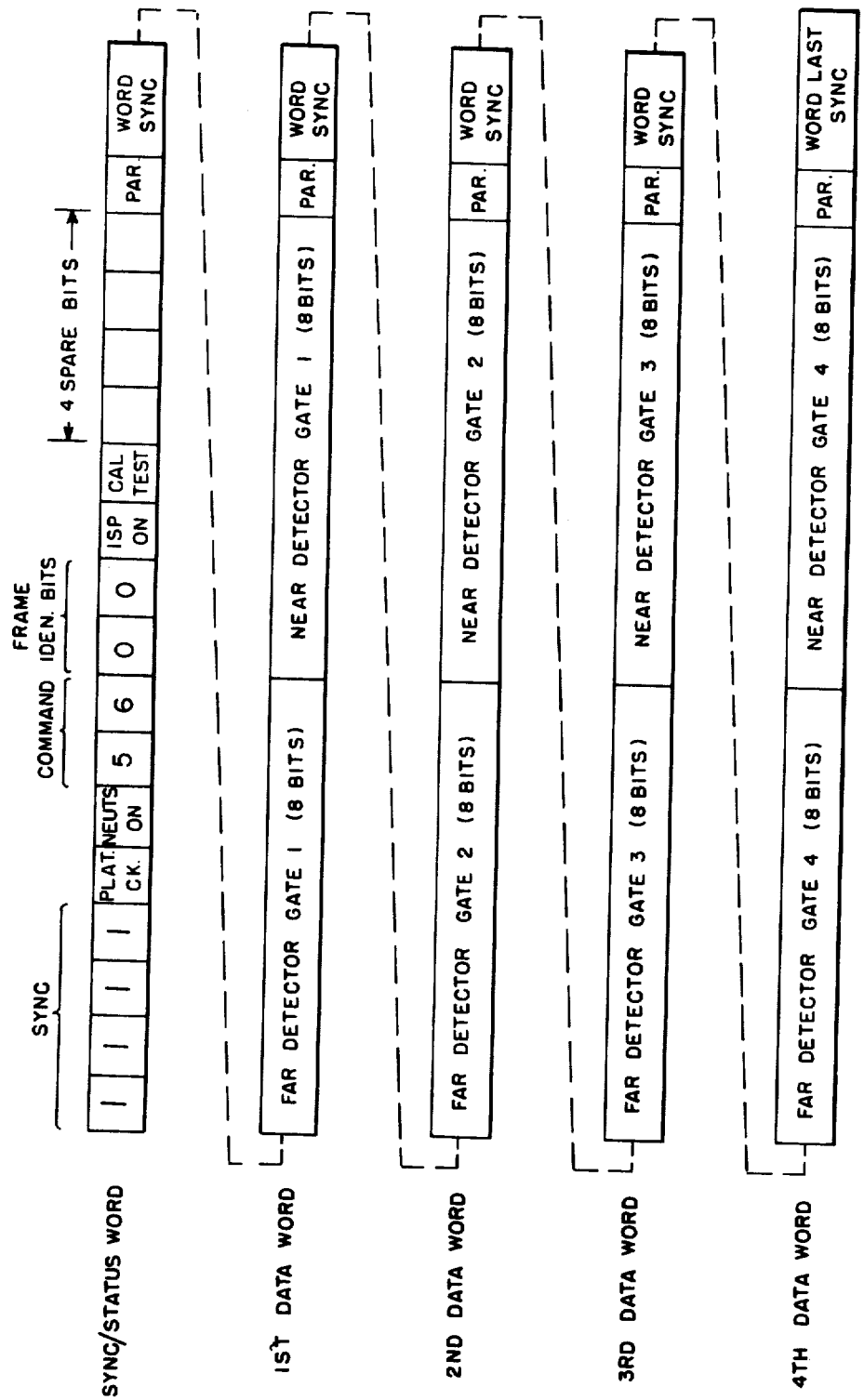
FIG. 10 shows an illustrated telemetry frame for transmitting data to the surface.
Figure 11:
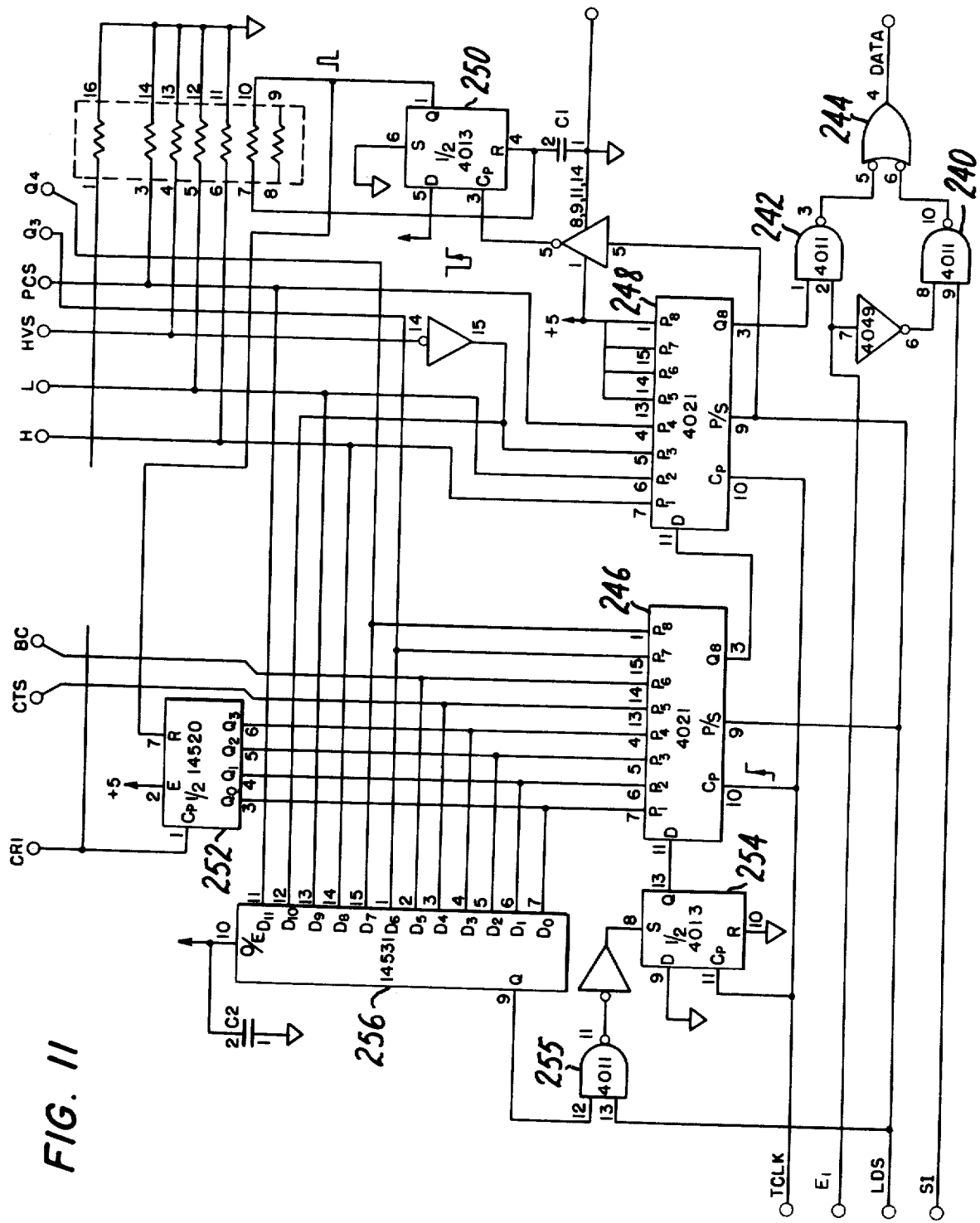
FIG. 11 is a schematic view of the sync/status circuit of FIG. 3.

Flip-flop 254 is loaded via gate 255 by the LDS signal with the Q output of the parity tree 256, which is the parity bit for the sync/status bit in FIG. 10. Inputs $P_5$–$P_8$ of shift register 248 are connected to +5 V. They control the first 4 DATA bits that are the sync signal. The other bits are the status signals and are applied to the rest of the shift register 248 inputs and the inputs of shift register 246 as follows:

TABLE IV

| Circuit | Input | Signal |
|---|---|---|
| 248 | $P_4$ | Plateau Check Status |
| 248 | $P_3$ | High Voltage Status (Neutrons On) |
| 248 | $P_2$ | L = Command 05 in effect |
| 248 | $P_1$ | H = Command 06 in effect |
| 246 | $P_8$ | $Q_4$ - Higher order Frame I.D. bit |
| 246 | $P_7$ | $Q_3$ = Lower order Frame I.D. bit |
| 246 | $P_6$ | BC = Burst Control (ISP On) |
| 246 | $P_5$ | CTS = Calibration Test Status |
| 246 | $P_1$–$P_4$ | Spares |
| 254 | D | Parity Bit |

The status signals applied to these shifting circuits come from the command signal circuit 64 and the address generator 76. Following the sync/status word, $E_1$ goes low. This connects the SI input to the DATA output so that the serial data from the memory circuits 72 and 74 can be shifted onto the end of the sync/status word.

Figure 12:
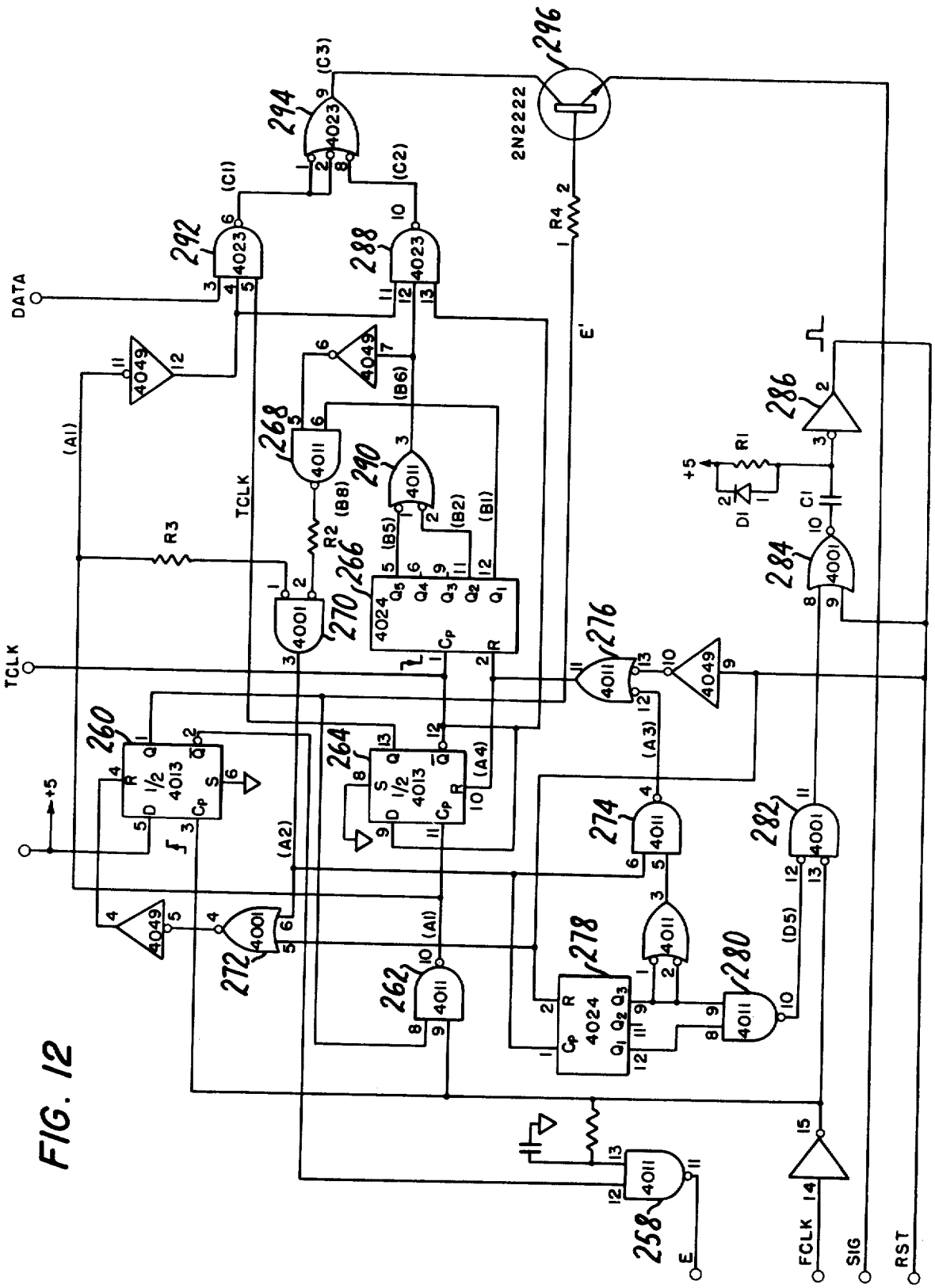
FIG. 12 is a schematic view of the telemetry interface circuit of FIG. 3.

The DATA signal which includes the data words and the sync/status word is sent to the telemetry interface circuit 78, shown in detail in FIG. 12, for transmission uphole. This circuit establishes the number of words to be sent in each telemetry frame and the number of bits in each word. There are only two input lines to the telemetry interface circuit, i.e. the FCLK signal from the telemetry circuit 34 and the serial data, or DATA, signal from the sync/status circuit. The outputs of the interface circuit are SIG and RST which go to the telemetry circuits 34, the E signal which goes to the address generator 76, and TCLK which goes to the address generator 76, the memory circuits 72 and 74 and the sync/status circuits 80.

The telemetry circuits 34 starts sending FCLK signals when it is time to send data uphole. Before FCLK arrives, E and E' (the output of flip-flop 260 as described below) are low and TCLK is high. The first half cycle of FCLK makes E high because one input of an NAND-gate 258 goes low after a short delay due to the R-C network on that input. The first time FLCK goes low, flip-flop 260 is clocked, causing its output E' to go high. The $\bar{Q}$ output of flip-flop 260 going low maintains E high by locking-up gate 258. The E signal is made to go high as soon as possible because the LDD signal in the address generator circuit 76 can occur as late as one ECLK cycle after E goes high.

With the E' signal high, the A1 signal at the output of NAND-gate 262 starts by going low and then follows the other input FCLK. The positive-going edges of A1 clock a flip-flop 264 whose Q output is TCLK. The TCLK signal also clocks the scaler 266 on negative-going edges. The purpose of scaler 266 is to count the number of bits per word, including the sync word. After being clocked 19 times, the outputs $B_1$, $B_2$, and $B_5$ of scaler 266 are all high and as a result the output B$_8$ of a NAND-gate 268 goes low. One-half FCLK cycle later, A1 goes low, causing the output A$_2$ of gate 270 to go high. The A2 pulse resets flip-flop 260 through gate 272 and, hence, it resets E'. Signal A2 also causes an A3 pulse to be generated in gate 274 and an A4 pulse to be generated in gate 276. The latter pulse resets flip-flop 264 and counter 266. In addition, the signal A2 adds a count to a word counter 278. The next time FCLK goes low, E' goes high again and the process is repeated. At the end of 5 words, the Q$_1$ and Q$_3$ outputs of word counter 278 cause the output D5 of gate 280 to go low. The next positive FCLK edge will pass through gate 282 and will trigger the one-shot comprised of gates 284 and 286 to produce the RST pulse. The RST pulse stops the FCLK from the telemetry circuits 34 and resets all the flip-flops and scalers in the interface circuit 78.

The output C2 of gate 288 is a series of 18 negative pulses, whose leading edges mark the boundaries of the 17 bits in a word. For C2 to go low, the output B6 of gate 290 must be high, i.e. either the B2 or B5 outputs of counter 266 must be low, TCLK must be high, and A1 must be low. The B6 output provides the word sync interval by going low to stop the C2 pulse. The DATA, A1 and $\overline{\text{TCLK}}$ signals are applied to gate 292 to create the C1 signal. For C1 to occur, DATA must be high while A1 and TCLK are both low. The C1 signal, when it occurs, is half-way between the C2 pulses. A signal C3 is an inverted mixture of C1 and C2 pulses, produced in inverter 294 and goes to the collector of a transistor 296. Waveform E' goes to the transistor base. The output (SIG) of the transistor at its emitter is connected to the emitter of a similar transistor in the telemetry circuits 34. When the telemetry is using the SIG line, the E' signal is low so the transistor 296 will look like an open circuit. Likewise, when the interface circuit is sending SIG, a similar transistor in the telemetry circuit 34 is cut off.

Thus, it can be seen that an FCLK signal from the telemetry circuits 34 generates the TCLK signal that shifts the data from the memories and the sync/status circuit through the telemetry interface transistor 296 to the telemetry circuit 34 itself. During this time, the number of bits in each word is counted and controlled as are the numbers of words in each frame.

The preferred procedure for computing $\tau$ from the near detector count rates N$_1$–N$_{16}$ will now be described. This procedure is the subject of the copending, commonly-owned U.S. application Ser. No. 955,176 for "Methods and Apparatus for Measuring Thermal Neutron Decay Characteristics of Earth Formations," filed concurrently herewith by C. W. Johnstone, and is being disclosed herein for purposes of completeness of disclosure.

As previously mentioned, the signal counting circuits 38 at the surface accumulate the count rate data for a time $\Delta t$ before transferring the data to the buffer storage 40 and being reset to begin a new counting sequence. Accordingly, the counts per time gate, i.e., N$_1$–N$_{16}$ for the near gates NG$_1$–NG$_{16}$, respectively, and F$_1$–F$_{16}$ for the far gates FG$_1$–FG$_{16}$, respectively, as transmitted to storage 40 and to the computer 42, are not actually count rates but are simply the counts accumulated within each gate over the data accumulation period $\Delta t$. Thus, where the data symbols N$_1$–N$_{16}$ and F$_1$–F$_{16}$ are referred to in the following discussion concerning the computation of $\tau$, it will be understood that these represent total counts over the time $\Delta t$, as the case may be, as distinct from the count rates generated for the respective time gates in the downhole scalers. To that end, an internal clock is provided in the surface equipment to measure the duration $\Delta t$ of each accumulation period in order to obtain accurate count rates for each gate.

In broad terms, the procedure followed in computing $\tau$, and thereafter in selecting the scale factor F, is as follows: New values of $\tau$ are calculated periodically for each detector based on ratios R formed for each detector from the respective net (background-corrected) count rates, as accumulated at the surface over the period $\Delta t$, from selected sets of time gates. These values are hereinafter designated $\tau_N$ for the near detector values and $\tau_F$ for the far detector values. As is explained more fully hereinafter, there are preferably seven sets of gates, each corresponding to a different ratio R, for each of the four scale factors F. The particular combination of gates making up each ratio R is that combination which has been found to minimize the dispersion of $\tau$ on a given interval of $\tau$, chosen as the interval of validity of the corresponding ratio. Although the same set of gates is used in computing both $\tau_N$ and $\tau_F$, it is selected on the basis of a previously measured value of $\tau_N$ only and is that set which is valid for such value of $\tau_N$ for the F value then in use. Using the gate thus identified, the ratios R$_N$ and R$_F$ are computed. The new values of $\tau_N$ and $\tau_F$ are then calculated from linear equations in the form:

$$\tau = a + bR^{-1} \tag{1}$$

where a and b are coefficients which establish a linear relationship between R$^{-1}$ and $\tau$ over the interval of validity for that particular ratio R. The values of a and b for each ratio are computed beforehand and stored in the computer as a look-up library. Thereafter, the criteria for determining whether a change in the scale factor F is required are examined based on the new value of $\tau_N$ from Eq. (1). If it is determined that the scale value F must be changed, the appropriate command is sent downhole to the control circuits 33 to select the new F value as above described. Preferably commands to change F are sent only at the beginning of a new data accumulation period $\Delta t$ in order to avoid mixing data taken with two different F values.

This procedure, of course, is carried out repetitively in the course of a logging run, with new values of $\tau_N$ and $\tau_F$ being calculated at the end of each accumulation interval $\Delta t$ and new values of the scale factor F being selected as required. Since, as noted, commands to change F are sent only at the beginning of an accumulation period and since the $\tau$ computation and F selection procedure might well require an appreciable fraction of an accumulation period, commands to change F might be sent downhole at the beginning of every other accumulation period. For instance, for a typical logging speed of 1800 feet per hour, the accumulation time $\Delta t$ at the surface might be approximately 1 second, to provide accumulation times $\Delta t$ and hence $\tau$ measurements, corresponding to 6 inch depth intervals. Changes in F could therefore be made as frequently as once per foot of depth, which is quite adequate to follow the most rapid $\tau$ changes normally encountered, i.e. approximately 100 $\mu$sec per foot.

Figure 14:
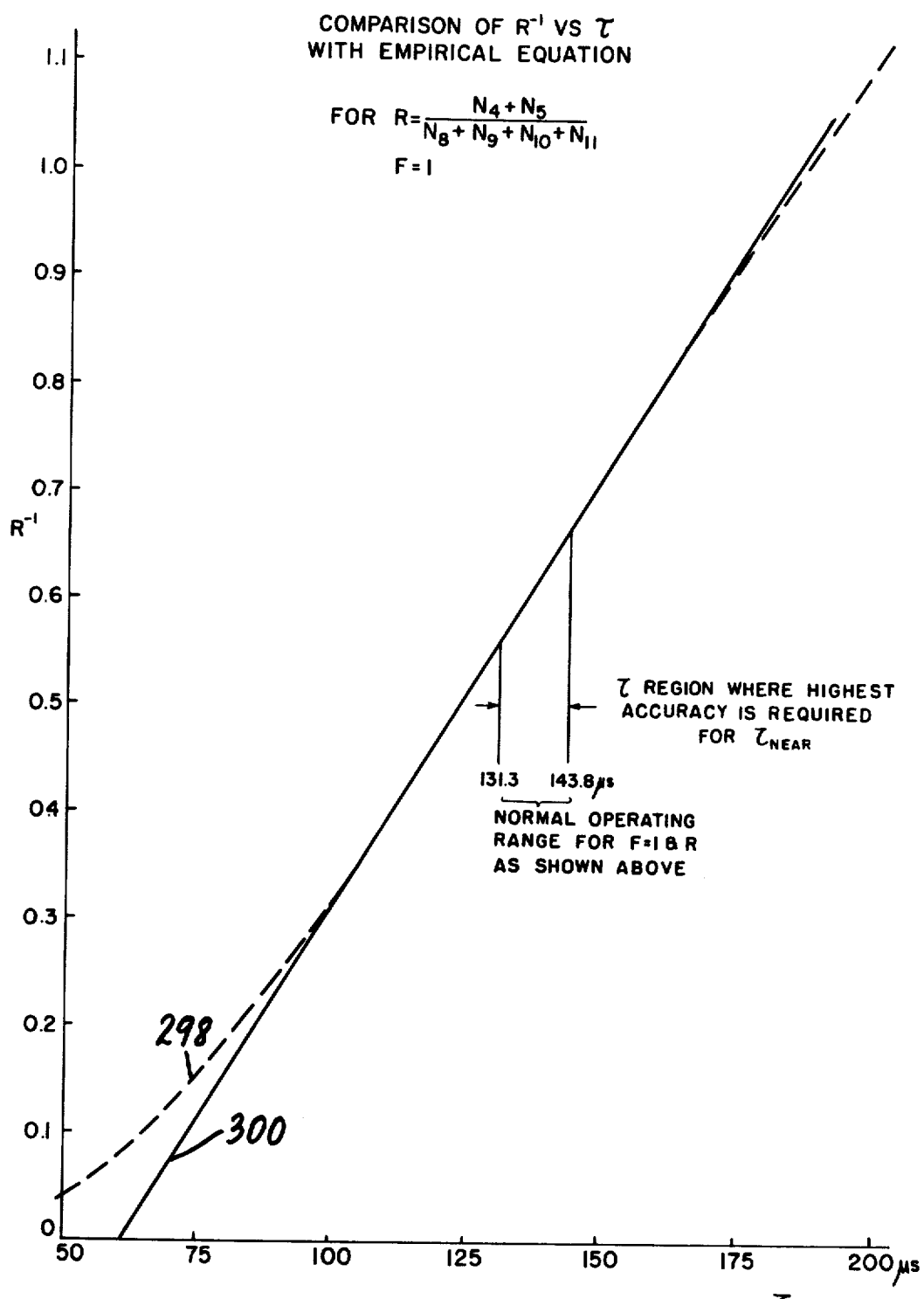
FIG. 14 is a graphical comparison of an exemplary empirical relationship for computing $\tau$ in accordance with the invention with the true relationship for $\tau$ for the example portrayed.

With reference now to FIGS. 13A, 13B and 14, the manner in which a library of gate sets for determining the ratios R$_N$ and R$_F$ and the corresponding values of the coefficients a and b for use in calculating $\tau$ in accordance with Eq. (1) are developed may be seen. As a principal object of the τ-computation procedure is to optimize the statistical precision of the value of τ obtained therefrom, it is desirable to use as many ratios as possible in order to decrease the statistical uncertainty of the result, but to use each ratio only over its τ range of validity. In order to ascertain which ratios afford optimum statistical precision in τ over the range of interest, some preliminary determinations must be made. First, it is desirable to allow for early non-exponential decay of the thermal neutron concentrations. This is done by choosing the first gate in each set as the one which begins most nearly at a time equal to twice the previous $\tau_N$ from the end of the neutron burst. Second, the gates used in the numerator and the gates used in the denominator are preferably contiguous in time. This is equivalent to using counts from only one gate for each of the numerator and denominator, such as the gate $\Delta T_1$ in FIG. 13A and the gate $\Delta T_2$ in FIG. 13B, respectively. Following this, the number and identity of the gates included in each term of the ratio is determined empirically. As the initial step, the mean count rate in each gate is determined from the expression:

$$N_{ij} = \frac{A_o(1 - e^{-T_B/\tau})}{T_p(1 - e^{-T_B/\tau})} (e^{-T_i/\tau} - e^{-T_j/\tau}) + \frac{B_o T_B}{T_p^2} (T_j - T_i) \quad (2)$$

where: $N_{ij}$ represents the mean number of counts/sec in a gate which begins at a time $T_i$ and ends at a time $T_j$ with respect to the end of the neutron burst; $T_B$ and $T_p$ are, respectively, the duration and repetition period of the neutron burst; and (where the times are expressed in units of seconds) $A_o$ is the total number of decay signal counts that would be detected following a single long burst of neutrons ($T_B >> \tau$) and $B_0$ is the total background counts/sec if a steady neutron flux with the same intensity as that occurring during the neutron burst $T_B$ is assumed.

$A_o$ depends upon peak neutron yield and detector size, efficiency and spacing, as well as on tool environment. $B_o$ depends on all of the foregoing and additionally upon time, since the major contributor to $B_o$ with a NaI detector is the 25 minute neutron activation of I in the detector crystal. Typical observed values of $A_o$ range from 50-100 counts for the near detector and from 9-25 counts for the far detector. $B_o$ builds up to approximately $5 \times 10^4$ counts/sec and $0.6 \times 10^4$ counts/sec for the near and far detectors, respectively.

Using Eq. (2), the gate counting rates are calculated for a given F value. For example, for the case of F=1, τ=137.5 μsec, $A_o$=50 counts and $B_o$=4×10⁴ cps and using the gate times and durations of FIG. 2, the following counting rate table is obtained:

TABLE V

| 4 | 453.9 | 55.4 | 509.3 |
| 5 | 693.9 | 110.8 | 804.7 |
| 6 | 482.4 | 110.8 | 593.2 |
| 7 | 335.2 | 110.8 | 446.0 |
| 8 | 233.0 | 110.8 | 343.8 |
| 9 | 274.6 | 221.7 | 496.3 |
| 10 | 132.8 | 221.7 | 354.5 |
| 11 | 64.1 | 221.7 | 285.8 |
| 12 | 31.1 | 221.7 | 252.8 |
| 13 | 22.2 | 443.3 | 465.5 |
| 14 | 5.2 | 443.3 | 448.5 |
| 15 | 1.3 | 443.3 | 444.6 |
| 16 | 0.2 | 443.3 | 443.5 |

In Table V, the background counting rate is taken as the sum of the counting rates from gates $G_{15}$ and $G_{16}$, as applied proportionately to each gate. Since gates $G_{15}$ and $G_{16}$ are each 200 μsec long, the background counting rate for gates $G_{13}$ and $G_{14}$, each also 200 μsec long, is one-half the $G_{15}$ and $G_{16}$ total, the background counting rate for gates $G_9$–$G_{12}$, each 100 μsec long, is one-quarter the gate $G_{15}$ and $G_{16}$ total, and so forth.

A reasonable set of gates is then selected and the fractional standard deviation $\sigma_R/R$ in the ratio R of the count rates from such gates is calculated from:

$$\frac{\sigma_R}{R} = \sqrt{\left[\frac{\sigma_N}{N_N}\right]^2 + \left[\frac{\sigma_D}{D_N}\right]^2} \quad (3)$$

where: $N_N$ is the numerator net counting rate and $D_N$ is the denominator net counting rate. The standard deviations in the numerator counting rate $\sigma_N$ and the denominator counting rate $\sigma_D$ are given by:

$$\sigma_N = \sqrt{N_G + \left[N_B \frac{\sqrt{B}}{B}\right]^2} \quad (4)$$

and $$\sigma_D = \sqrt{D_G + \left[D_B \frac{\sqrt{B}}{B}\right]^2} \quad (5)$$

where $N_B$ is numerator background counting rate, $D_B$ is the denominator background counting rate, B is the sum of the counting rates from gates $G_{15}$ and $G_{16}$, $N_G$ is the sum of $N_N$ and $N_B$, and $D_G$ is the sum of $D_N + D_B$.

Using Eq. (3), the fractional standard deviation $\sigma_R/R$ of the ratio is computed for several different background smoothing times, e.g. 1, 2, 4 and 8 seconds. For instance, for the data of Table V the term $\sqrt{B}/B$ in Eqs. (4) and (5) is 0.0336 for a 1-second averaging time, but is only one half of that, or 0.0186, for a 4-second averaging time. With the $\sigma_R/R$ values thus obtained, the fractional standard deviation $\sigma_\tau/\tau$ in τ is calculated from:

$$\frac{\sigma_\tau}{\tau} = K \frac{\sigma_R}{R} \quad (6)$$

where:

$$K = \frac{\tau}{\frac{\Delta T_1}{e^{\Delta T_1/\sigma} - 1} + (T_2 - T_1) - \frac{\Delta T_2}{(e^{\Delta T_2/\tau} - 1)}} \quad (7)$$

where: $\Delta T_1$, $\Delta T_2$, $T_1$ and $T_2$ are the durations and times of the numerator and denominator gates as taken as single long gates in the manner illustrated in FIGS. 13A and 13B.

Repeated solutions of Eqs. (3) and (6) are made for different gate sets, and their respective K values from Eq. (7), until it is determined that the minimum $\sigma_\tau/\tau$ has been found. Some compromise may be required, since a ratio (gate set) which gives the best results with one background smoothing time may not be optimum with another.

By way of illustration, six different gate sets, each affording a different ratio R, have been selected for the case of Table V (τ=137.5 μsec and F=1) as listed below in Table VI.

The results obtained from the solution of Eqs. (3) and (6) are shown opposite each ratio for both 1-second and 4-second background smoothing times. The K value obtained through solution of Eq. (7) for each ratio is also shown.

TABLE VI

|  | Ratio | K | 1-Sec. Bkgnd. Ave. $\sigma_R/R$ | 1-Sec. Bkgnd. Ave. $\sigma_\tau/\tau$ | 4-Sec. Bkgnd. Ave. $\sigma_R/R$ | 4-Sec. Bkgnd. Ave. $\sigma_\tau/\tau$ |
|---|---|---|---|---|---|---|
| (1) | $\dfrac{G_4 + G_5}{G_8 + G_9 + G_{10} + G_{11}}$ | .553 | 7.33% | 4.05% | 6.58% | 3.64% |
| (2) | $\dfrac{G_4 + G_5}{G_7 + G_8 + G_9 + G_{10}}$ | .722 | 5.72% | 4.13% | 5.35% | 3.86% |
| (3) | $\dfrac{G_4 + G_5}{G_8 + G_9 + G_{10} + G_{11} + G_{12}}$ | .527 | 7.94% | 4.19% | 6.87% | 3.62% |
| (4) | $\dfrac{G_4 + G_5}{G_7 + G_8 + G_9 + G_{10} + G_{11}}$ | .670 | 6.02% | 4.03% | 5.47% | 3.67% |
| (5) | $\dfrac{G_4 + G_5 + G_6}{G_8 + G_9 + G_{10} + G_{11}}$ | .599 | 7.15% | 4.28% | 6.37% | 3.81% |
| (6) | $\dfrac{G_4 + G_5}{G_8 + G_9 + G_{10}}$ | .598 | 6.92% | 4.14% | 6.43% | 3.84% |

As may be seen, ratios (1) and (4) yield close to the same minimum value $\sigma_\tau/\tau$ when background is averaged for 1 second, whereas with 4-second averaging ratios (1) and (3) are best, with ratio (4) close behind. In this case, therefore, ratio (1) would be the preferred ratio for use where $\tau$ is within the neighborhood of 137.5 $\mu$sec and $F=1$. (See also Table VII below). The data of Table VI also shows that there is not a great deal of variation between the best and the worst values of $\sigma_\tau/\tau$ among all of the ratios. This occurs because the corresponding variation in K tends to compensate for the variation in $\sigma_R/R$ with different ratios.

Tables like Tables V and VI are also prepared for other $\tau$'s within each $\tau$ range and for all of the other $\tau$ ranges over the full range of interest, e.g. from 50 $\mu$sec to 600 $\mu$sec. In general, calculations are preferably made for three $\tau$'s within each $\tau$ range, suitably the mean value and one near or at each extreme of the range. For instance, for the $\tau$ range of 131.3–143.8 $\mu$sec, calculations might be made for $\tau$'s of 131 $\mu$sec, 137.5 $\mu$sec and 144 $\mu$sec. The ratio which best minimizes $\sigma_\tau/\tau$ over the entire $\tau$ range is then selected as the one to be used for that particular range.

The same process is repeated for each of the remaining F values of $1/\sqrt{3}$, $\sqrt{3}$ and 3 to build up a complete library of ratios for all of the scale factors. Tables V and VI, it will be recalled, represent only a single F value, i.e., $F=1$, and only a single $\tau$, i.e., $\tau = 137.5$ $\mu$sec.

It will be appreciated, therefore, that the foregoing calculations will lead to a number of ratios, or gate sets, for each F value, with each ratio corresponding to a particular $\tau$ range, as aforementioned. The number of ratios used for each F will depend upon the number of F values used and on the desired degree of precision in $\tau$. With 4F's, it has been found preferable to use seven ratios for each F value. This number of ratios allows precise calculation of $\tau$ over the full $\tau$ range associated with each F value. The particular $\tau$ limits for each ratio and for each F value may of course vary from those described herein, which are illustrative.

In accordance with the foregoing, a representative library of ratios for the full $\tau$ range of from approximately 50 $\mu$sec to approximately 600 $\mu$sec might be as follows (for convenience, the symbol G has been omitted from the gate numbers):

TABLE VII

| $\tau$ Range | F | Ratio R | Equation for $\tau$ |
|---|---|---|---|
| $\tau < 61.3$ $\mu$s | $\dfrac{1}{\sqrt{3}}$ | $\dfrac{1+2}{5+6+7+8+9}$ | $\tau = 21.9 + 40.4\, R^{-1}$ |
| 61.3–68.5 | " | $\dfrac{2+3}{6+7+8+9+10}$ | $\tau = 27.9 + 42.2\, R^{-1}$ |
| 68.5–75.8 | " | $\dfrac{3+4}{7+8+9+10+11}$ | $\tau = 33.6 + 43.9\, R^{-1}$ |
| 75.8–83.0 | " | $\dfrac{4+5}{8+9+10+11}$ | $\tau = 35.4 + 71.6\, R^{-1}$ |
| 83.0–93.8 | " | $\dfrac{5+6}{9+10+11+12}$ | $\tau = 39.0 + 94.8\, R^{-1}$ |
| 93.8–108.3 | " | $\dfrac{6+7}{9+10+11+12+13}$ | $\tau = 30.9 + 75.2\, R^{-1}$ |
| $\tau > 108.3$ | " | $\dfrac{7+8}{10+11+12+13}$ | $\tau = 36.5 + 95.0\, R^{-1}$ |
| $\tau < 106.3$ | 1 | $\dfrac{1+2}{5+6+7+8+9}$ | $\tau = 38.0 + 69.9\, R^{-1}$ |
| 106.3–118.8 | " | $\dfrac{2+3}{6+7+8+9+10}$ | $\tau = 48.4 + 73.1\, R^{-1}$ |
| 118.8–131.3 | " | $\dfrac{3+4}{7+8+9+10+11}$ | $\tau = 58.2 + 76.1\, R^{-1}$ |
| 131.3–143.6 | " | $\dfrac{4+5}{8+9+10+11}$ | $\tau = 61.3 + 124.1\, R^{-1}$ |
| 143.8–162.5 | " | $\dfrac{5+6}{9+10+11+12}$ | $\tau = 67.6 + 164.2\, R^{-1}$ |
| 162.5–187.5 | " | $\dfrac{6+7}{9+10+11+12+13}$ | $\tau = 53.6 + 130.3\, R^{-1}$ |
| $\tau > 187.5$ | " | $\dfrac{7+8}{10+11+12+13}$ | $\tau = 63.2 + 164.6\, R^{-1}$ |

TABLE VII-continued

| τ Range | F | Ratio R | Equation for τ |
|---|---|---|---|
| τ < 184.0 μs | $\sqrt{3}$ | $\dfrac{1+2}{5+6+7+8+9}$ | $\tau = 65.8 + 121.1\,R^{-1}$ |
| 184.0–205.7 | " | $\dfrac{2+3}{6+7+8+9+10}$ | $\tau = 83.7 + 126.7\,R^{-1}$ |
| 205.7–227.3 | " | $\dfrac{3+4}{7+8+9+10+11}$ | $\tau = 100.9 + 131.8\,R^{-1}$ |
| 227.3–249.0 | " | $\dfrac{4+5}{8+9+10+11}$ | $\tau = 106.2 + 215.0\,R^{-1}$ |
| 249.0–281.5 | " | $\dfrac{5+6}{8+9+10+11}$ | $\tau = 78.9 + 266.0\,R^{-1}$ |
| 281.5–324.8 | " | $\dfrac{6+7}{9+10+11+12}$ | $\tau = 72.7 + 265.5\,R^{-1}$ |
| τ > 324.8 | " | $\dfrac{7+8}{10+11+12+13}$ | $\tau = 109.4 + 285.0\,R^{-1}$ |
| τ < 318.8 | 3 | $\dfrac{1+2}{5+6+7+8+9}$ | $\tau = 114.0 + 209.7\,R^{-1}$ |
| 318.8–356.3 | " | $\dfrac{2+3}{6+7+8+9+10}$ | $\tau = 145.0 + 219.4\,R^{-1}$ |
| 356.3–393.8 | " | $\dfrac{3+4}{6+7+8+9+10}$ | $\tau = 111.0 + 206.3\,R^{-1}$ |
| 393.8–431.3 | " | $\dfrac{4+5}{7+8+9+10+11}$ | $\tau = 136.2 + 305.1\,R^{-1}$ |
| 431.3–487.5 | " | $\dfrac{5+6}{8+9+10+11}$ | $\tau = 136.7 + 461.0\,R^{-1}$ |
| 487.5–562.5 | " | $\dfrac{6+7}{9+10+11+12}$ | $\tau = 126.1 + 460.0\,R^{-1}$ |
| τ > 562.5 | " | $\dfrac{7+8}{10+11+12+13}$ | $\tau = 189.5 + 494.0\,R^{-1}$ |

There is no simple relationship between R and τ from which τ may be obtained directly once the ratio has been calculated. However, as each ratio R is used over only a limited range of τ, a linear relationship can be established between R and τ which closely approximates the true relationship therebetween. For instance, the dashed curve 298 in FIG. 14 illustrates an example of the true relationship between τ and $R^{-1}$ given by the equation:

$$R = \frac{e^{\frac{T_2 - T_1}{\tau}}\left(1 - e^{\frac{-\Delta T_1}{\tau}}\right)}{\left(1 - e^{\frac{-\Delta T_2}{\tau}}\right)} \quad (8)$$

where the terms $\Delta T_1$, $\Delta T_2$, $T_1$ and $T_2$ are defined according to FIGS. 13A and 13B.

Eq. (8) is solved with assumed values of τ over the range 50 μsec, using the gate set $(G_4+G_5)/(G_8+G_9+G_{10}+G_{11})$, where $G_4=25$ μsec, $G_5$ and $G_8=50$ μsec each, and $G_9$, $G_{10}$ and $G_{11}=100$ μsec each, and curve 298 of FIG. 14 is the result. In this instance, F=1. From Table VII, the region of the dashed curve 298 over which the highest accuracy in τ is required is from 131.3 μsec to 143.8 μsec, this being the τ interval of validity for the particular gate set and F value represented by curve 298. Accordingly, the solid straight-line curve 300 in FIG. 14 is made to fit these points as closely as possible by entering the τ and $R^{-1}$ values in Eq. (1) for each of these points and solving the resulting simultaneous equations for the values of the coefficients a and b. This gives, for the example of FIG. 14, an a value of 61.3 and a b value of 124.1.

A solution of the equation for curve 300 in FIG. 14, i.e., $\tau = 61.3 + 124.1\,R^{-1}$, for the $R^{-1}$ values used in plotting FIG. 14 gives calculated τ values as shown in Table VIII, from which it may be seen that the accuracy of the calculated τ is ±1% or better over approximately a 2-to-1 τ range, namely, from 100 μsec to 200 μsec.

TABLE VIII

| True τ (μsec) | $R^{-1}$ | Calc. τ (μsec) |
|---|---|---|
| 50 | 0.0388 | 66.1 |
| 75 | 0.1520 | 80.2 |
| 100 | 0.3194 | 100.9 |
| 115 | 0.4340 | 115.2 |
| 125 | 0.5133 | 125.0 |
| 137.5 | 0.6139 | 137.5 |
| 150 | 0.7147 | 150.0 |
| 175 | 0.9126 | 174.6 |
| 200 | 1.1014 | 198.0 |

The values of the coefficients a and b for the remaining combinations of F and gates sets of Table VII are determined in a like manner to develop the complete library of expressions of Eq. (1) for use in solving for $\tau_N$ and $\tau_F$, based on respective measured values of $R_N$ and $R_F$. These expressions are also listed in Table VII opposite the corresponding ratios and are also stored in the computer 42 in correspondence with the associated F value and ratio gate set. It will be understood that the values of the coefficients a and b will differ from those set out in Table VII if F values other than $1/\sqrt{3}$, 1, $\sqrt{3}$ and 3 are used or if different gates are used in determining the ratios R.

As mentioned, the counting rates from the various gates used in computing the ratios $R_N$ and $R_F$ are net counting rates over the accumulation period Δt. To obtain the net counting rates, it is necessary to determine the background counting rate and subtract the appropriate amount from the gross gate counting rates. As background counting rate is unknown and varies, it must be estimated. Since the background counting rates generally change slowly, it is permissible to average it over a relatively long time, i.e. 4–8 seconds as compared to a normal accumulation period Δt of 1 second for the gross gate counting rate. It has been found that for the first four sets of gates and equations for each F value in Table VII, it is sufficient to assume that gates 15 and 16 contain only background signal, and the gross counting rates $N_{15}$ and $N_{16}$ from these gates may simply be accumulated and averaged over the background accumulation period and then subtracted from the gross counting rates from the gates to be used in determining the ratios. In the case of the last three gate sets and equations for each F value, however, it has been found necessary to adjust the coefficients a and b to correct for the presence of a small, but significant, amount of decay signal in the gross counting rates of gates 15 and 16. The manner in which this background adjustment is made may be seen by considering, as an example, the case of $F=1$ and $R=(G_7+G_8)/(G_{10}+G_{11}+G_{12}+G_{13})$. First, the true mean counting rates $N_7$, $N_8$, $N_{10}$, etc. in each of the gates $G_7$, $G_8$, $G_{10}$, etc. must be determined. This may be done as described above by use of Eq. (2). For the example at hand, and assuming $\tau=185$ μsec, $A_o=100$ and $F=1$ and using the neutron burst and detection gate times of FIG. 2, Eq. (2) yields the following "true" decay signal count rates (in cps) in each of the gates of interest: $N_7=881.0$, $N_8=672.3$, $N_{10}=526.9$, $N_{11}=306.8$, $N_{12}=178.8$, $N_{13}=164.8$, $N_{15}=18.9$ and $N_{16}=6.4$. The magnitude of the decay signal which would be subtracted from a 200 μsec time gate along with the background, therefore, would be $(N_{15}+N_{16})/2=12.65$ cps. This would give apparent "net" count rates (in cps) for the gates of interest of $N_7(\text{net})=881.0-12.65/4=877.8$,
$N_8=672.3-12.65/4=669.1$,
$N_{10}=526.9-12.65/2=520.6$,
$N_{11}=306.8-12.65/2=300.5$,
$N_{12}=178.8-12.65/2=172.5$ and
$N_{13}=164.8-12.65=152.2$. Similarly, for $\tau=210$ μsec (all other parameters remaining the same), Eq. (2) yields true decay signal count sates (cps) of $N_7=1019.2$, $N_8=803.0$, $N_{10}=702.8$, $N_{11}=436.8$, $N_{12}=271.6$, $N_{13}=273$, $N_{15}=40.6$, and $N_{16}=15.7$. Summing the count rates from gates $G_{15}$ and $G_{16}$ and dividing by two, the decay signal subtracted along with background from a 200 μsec gate to obtain the "net" count rate would be 28.15 cps. The respective "net" count rates (in cps) therefore, are $N_7=1012.2$, $N_8=796.0$, $N_{10}=688.7$, $N_{11}=422.7$, $N_{12}=257.5$, $N_{13}=244.9$.

Forming the ratio $R=(N_7+N_8)/(N_{10}+N_{11}+N_{12}+N_{13})$ for both $\tau=185$ μsec and $\tau=210$ μsec, the respective values of R are 1.350 and 1.1205, with the corresponding values of $R^{-1}$ being 0.7407 and 0.8925. The two sets of $\tau$'s and R's may then be used to solve for the adjusted values of the coefficients a and b in Eq. (1). This gives $a=63.0$ and $b=164.7$, so that if gates $G_{15}$ and $G_{16}$ are used for background, the resulting equation for the gate set $(N_7+N_8)/(N_{10}+N_{11}+N_{12}+N_{13})$ is $\tau=63.0+164.7R^{-1}$. This is not quite identical to the equation for this gate set in Table VII, since that equation was made to fit the "true" $\tau$ vs. $R^{-1}$ curve at $\tau$'s of 187 μsec and 212.5 μsec, whereas $\tau$'s of 185 and 210 have been used for the purpose of this example. However, the differences between the two equations are quite minor. It will be appreciated, therefore, that the presence of decay signal in the "background" gates $G_{15}$ and $G_{16}$ may properly be accounted for in the foregoing way for each of the last three gate sets and equations for all F values.

Eq. (7) for K assumes that there is no significant decay signal in gates $G_{15}$ and $G_{16}$, but only background signal. An alternative method of determining K, and one which can be used whether or not there is non-negligible signal mixed with background in gates $G_{15}$ and $G_{16}$, is to calculate a $\Delta R^{-1}$ to go with a $\Delta \tau$, and then solve for R from:

$$\Delta\tau/\tau = K\Delta R^{-1}/R^{-1} \tag{8}$$

For example, to find K for the case of $F=1$ and $\tau=200$ μsec using the gate set $(G_7+G_8)/(G_{10}+G_{11}+G_{12}+G_{13})$ and further using gates $G_{15}$ and $G_{16}$ for background, values of $R^{-1}$ are computed as before by solving Eq. (2) for the respective gate counting rates and taking the inverse of the ratio for two values of $\tau$ spaced equally on either side of the $\tau$ in question, i.e. $\tau=200$ μsec. Hence, for example, for $\tau=213$ μsec and 187 μsec, for a $\Delta\tau$ of 26 μsec, values of $R^{-1}$ of 0.9105 and 0.7527, respectively, are obtained, for a $\Delta R^{-1}$ of 0.1578. For the mean $\tau$ of 200 μsec, the mean $R^{-1}$ is 0.8316. K is then readily obtained from Eq. (8) by inserting 200 μsec for $\tau$, 0.8316 for $R^{-1}$, 26 μsec for $\Delta\tau$ and 0.1578 for $\Delta R^{-1}$, giving for K a value of 0.685. This value is then used in Eq. (6) to determine the fractional standard deviation in $\tau$.

As noted above, the same time gates are used for the far detector 26 as for the near detector 24, i.e., $NG_1=FG_1$, $NG_2=FG_2$, . . . $NG_{16}=FG_{16}$, and the same F value, selected on the basis of new $\tau_N$, is also used for both detectors. Likewise, $\tau_F$ is calculated based on the same type of equation as $\tau_N$, i.e., the equations of Table VII, but using of course the counting rates from the far-detector gates. Background correction of the far-detector counting rates, and of the coefficients a and b if needed, is made in the same manner as described above in connection with the near detector. Because $\tau_F$ tends to be larger than $\tau_N$, the first gate chosen for calculating $\tau_F$ is generally less than $2\times\tau_F$ from the end of the neutron burst. While this does not seriously affect the value of $\tau_F$, having the far-detector gates begin closer than $2\times\tau_F$ affords the substantial statistical advantage of significantly increasing the counting rates in the far-detector gates. For instance, if $\tau_F$ is $1.25\times\tau_N$, the far-detector counting rates $F_1$, $F_2$. . . $F_{16}$ are on the order of 1.3 times higher than would be the case if $\tau_F$ equalled $\tau_N$. The fact of $\tau_F$ being larger than $\tau_N$ does result in relatively more decay signal in gates $FG_{15}$ and $FG_{16}$. This effect, however, does not appear significant, and at the most $\tau_F$ might be decreased as a result thereof by about 1% when $\tau_F=1.15\ \tau_N$. An important benefit of $\tau_F$ is that it is substantially free of neutron-diffusion effects. It is, therefore, quite useful for applications where diffusion effects must be considered.

Once $\tau_N$ and $\tau_F$ have been determined, $\Sigma_N$ and $\Sigma_F$ can readily be computed using the expression:

$$\Sigma = (4550/\tau \tag{9}$$

where $\Sigma$ is in capture units and $\tau_N$, or $\tau_F$, is in μsec.

It may also be desirable to obtain a ratio, generally designated the N/F ratio, of the counting rates from certain near and far detector gates. Such a ratio, plotted against $\Sigma_N$ and/or $\Sigma_F$, is useful in obtaining apparent values of porosity and water salinity in accordance with U.S. Pat. No. 3,971,935, granted July 27, 1976 to W. B. Nelligan. The ratio N/F may take various forms, but preferably is formed from the gates used in computing $\tau$ plus all intermediate gates. For example, for the case of $F=1$ and $R=(G_6+G_7)/(G_9+G_{10}+G_{11}+G_{12}+G_{13})$ a suitable form of the ratio would be:

$$\frac{N}{F} = \frac{N_6 + N_7 + N_8 + N_9 + N_{10} + N_{11} + N_{12} + N_{13}}{F_6 + F_7 + F_8 + F_9 + F_{10} + F_{11} + F_{12} + F_{13}} \quad (10)$$

where $N_6, \ldots N_{13}$ and $F_6, \ldots F_{13}$ are net counting rates averaged over the accumulation period $\Delta t$.

Figure 15:
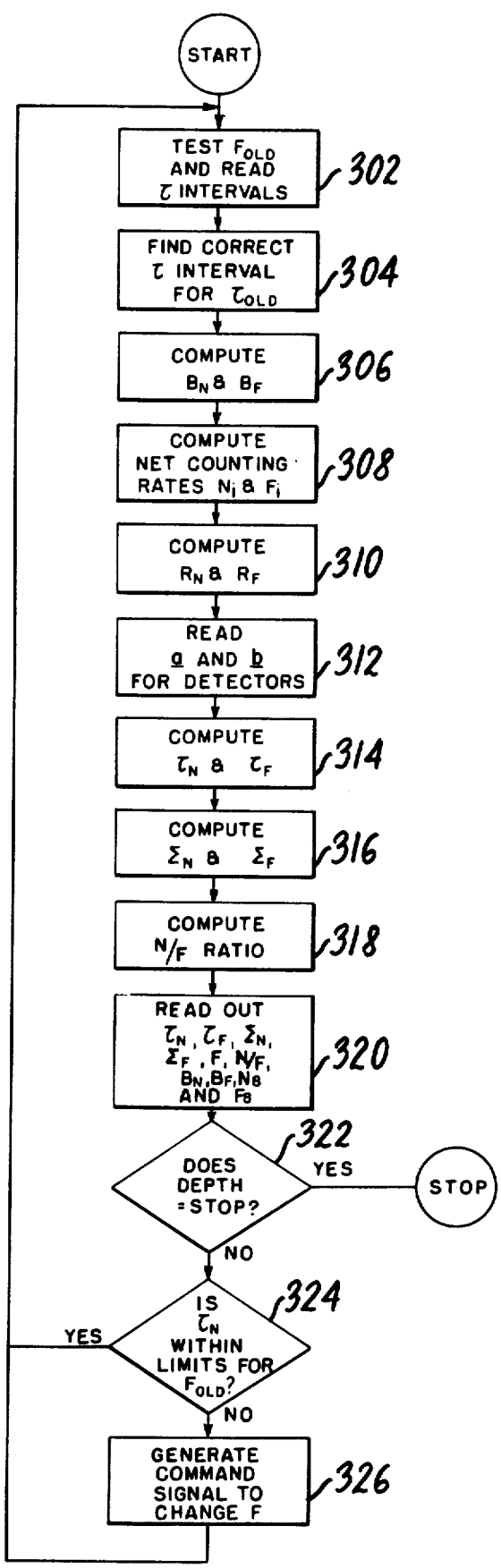
FIG. 15 is a generalized flow chart useful in programming a general purpose digital computer to carry out the $\tau$-computation and scale factor F selection procedures of the invention.

FIG. 15 illustrates a flow chart for implementing the $\tau$-computation and F selection procedures on a general purpose digital computer. If desired, these procedures could likewise be implemented by use of a microprocessor. It will be understood that a complete library of gate set ratios and $\tau$ equations in the form of Eq. (1) will have been determined beforehand for both detectors and stored in the computer in correlation with the respective F values and $\tau$ ranges. The criteria for governing changes in F will likewise have been previously determined and stored. Assuming the tool has been lowered in the borehole to the initial depth of interest and that an initial set of counting rate data $N_1, \ldots N_{16}$ and $F_1 \ldots F_{16}$ has been acquired over the period $\Delta t$ at the surface for initial $\tau$ and F values of $\tau = 200$ μsec and $F = 1$, respectively, the computer is first instructed at 302 to test F and read and $\tau$ intervals corresponding thereto. For example, from Table VII, there are seven $\tau$ intervals covering the initial $\tau$ range of from $< 106.3$ μsec to $> 187.5$ μsec. The computer next, as represented by box 304 in FIG. 15, locates the correct $\tau$ interval for the previous value of $\tau$, which in case of $\tau = 200$ is the last interval in Table VII for $F = 1$. Under instruction at 306, the computer then computes the near-detector background counting rate $B_N$ and the far-detector background counting rate $B_F$ by averaging the counting rates from $NG_{15}$ and $NG_{16}$, on the one hand, and $FG_{15}$ and $FG_{16}$, on the other hand, over the desired smoothing time, e.g. 1 second, 4 seconds, etc. Next, at step 308, the net counting rates $N_i$ and $F_i$ are computed, where i = each gate included in the ratio selected at step 304 and preferably all intermediate gates. In this case, this would include the gate set $(G_7 + G_8)/(G_{10} + G_{11} + G_{12} + G_{13})$ and the intermediate gate $G_9$. The computer is then instructed, at 310, to compute the ratios $R_N$ and $R_F$ from the respective net counting rates. Next, at 312, the computer is instructed to read the values of the coefficients a and b, e.g., $a = 63.2$ and $b = 164.6$, and then, at 314, to compute the new $\tau_N$ and the new $\tau_F$ from the linear function $\tau = a + bR^{-1}$ using the appropriate values of a, b and $R^{-1}$.

At this point, the computer may also determine $\Sigma_N$ and $\Sigma_F$ according to Eq. (9), as indicated at step 316 in FIG. 15, and if desired may also compute the N/F ratio in accordance with Eq. (10), as indicated at box 318 in FIG. 15. The computer may also be instructed at this point, as indicated at box 320, to read out to the recorder 44 the new values of $\tau_N$, $\tau_F$, $\Sigma_N, \Sigma_F, \Sigma_F$ and N/F for recording as a fuction of tool depth. Other outputs such as the background counting rates $B_N$ and $B_F$, and counting rates $N_8$ and $F_8$ (gross or net) from the near detector gate $NG_8$ and the far detector gate $FG_8$, respectively, may also be read out and recorded for monitoring purposes.

The computer then checks at test 322 to determine whether the end of the depth interval to be logged has been reached. If it has, the program terminates. If not, the computer then tests at 334 whether the new $\tau_N$ is within the limits established for the old value of F, here $F = 1$. With the criteria of Table I, for instance, if new $\tau_N$ is between 95 μsec and 210 μsec, new $\tau_N$ would be within the proper limits for $F_{old} = 1$ and the computer would then return to step 302 and begin a new $\tau$-computation sequence based on the counting rate data set acquired over the next data accumulation period $\Delta t$. However if new $\tau_N$ is either greater than 210 μsec or less than 95 μsec, the computer would carry out the additional step 326 of generating a new command signal for transmission downhole to change the scale factor value F to the appropriate value. For instance, if new $\tau_N$ was greater than 210 μsec, F would be changed to $\sqrt{3}$ and if new $\tau_N$ was less than 95 μsec it would be changed to $1/\sqrt{3}$. The computer would then return to step 302 and repeat the procedure as aforementioned until the tool had traversed the depth interval of interest.

Figure 16:
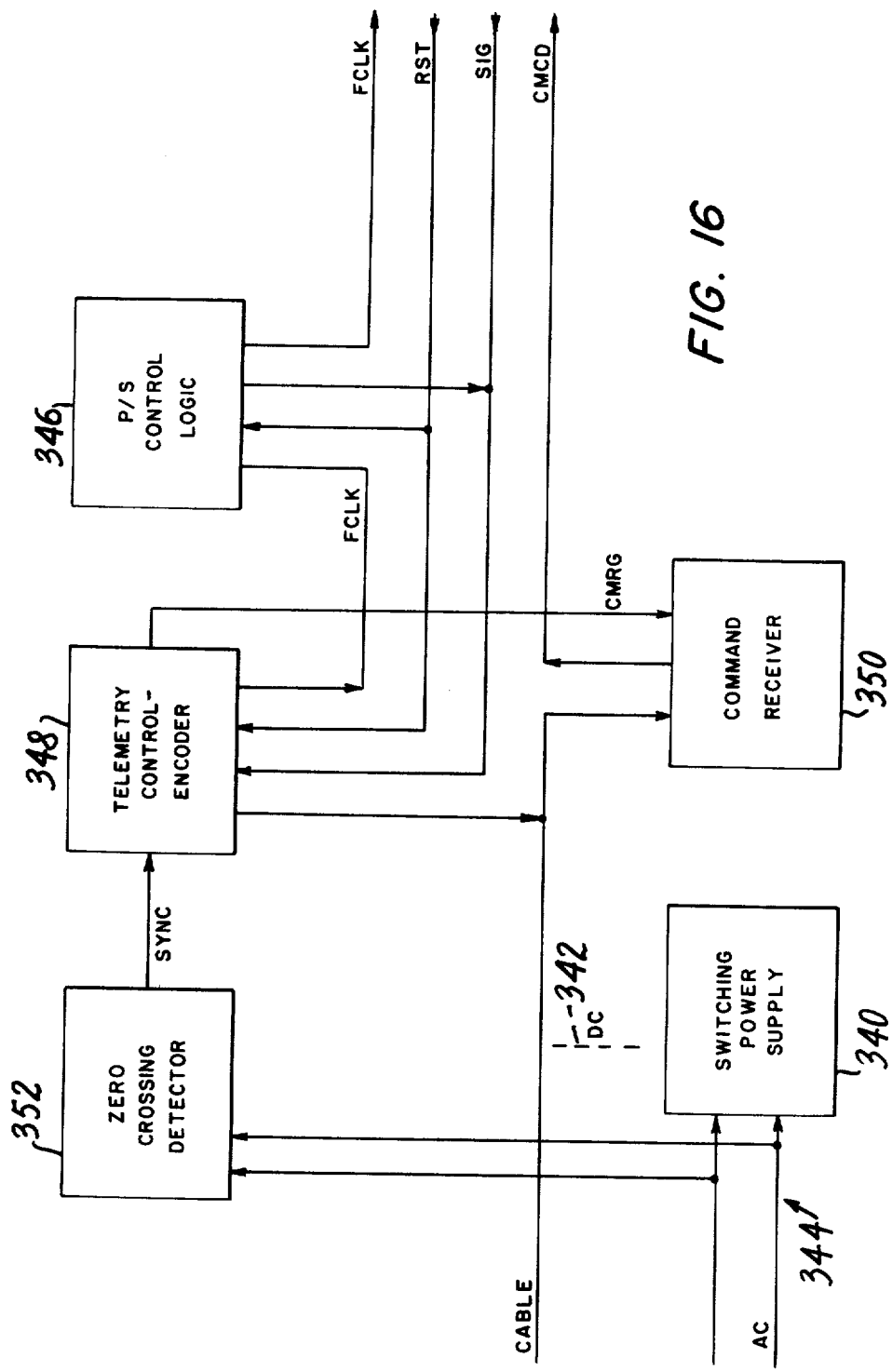
FIG. 16 is a block diagram of a preferred form of the downhole telemetry circuits.
Figure 17:
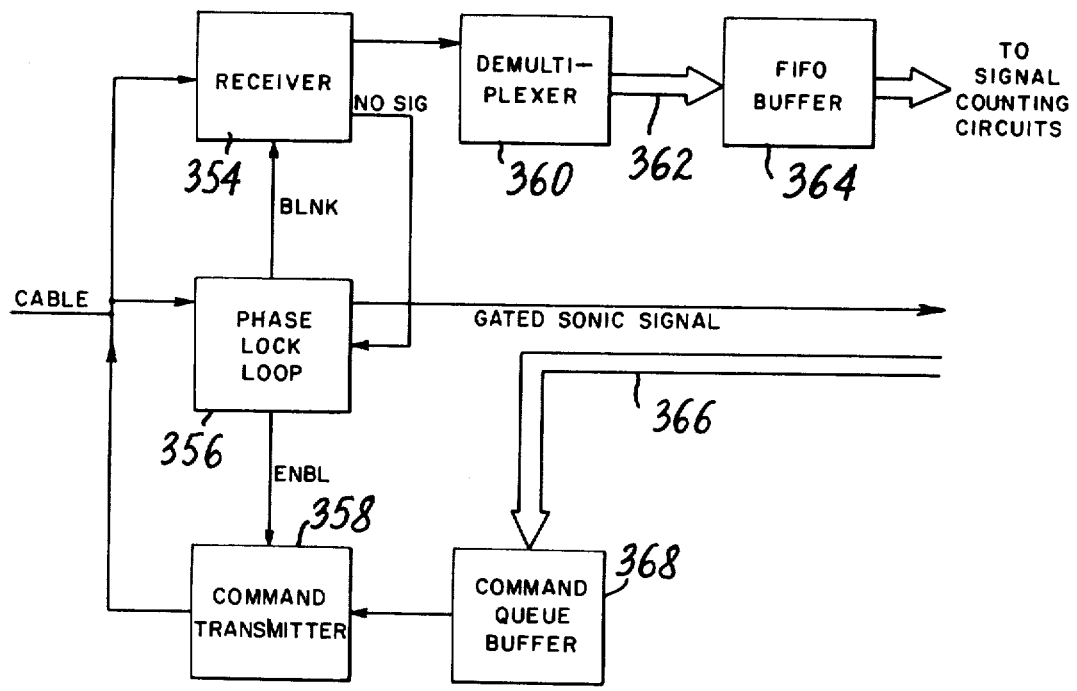
FIG. 17 is a block diagram of a preferred form of the uphole telemetry circuits.

As noted above, the telemetry circuits 34 and 36 may comprise any suitable bi-directional telemetry system, and the details thereof do not form a part of the present invention. The basic components and functions of a preferred form of telemetry system are illustrated in FIGS. 16 and 17. As there depicted, the system is a word-oriented, bi-directional telemetry system having a 10 kilo bit/sec upward data rate. The downhole circuits 34, illustrated in FIG. 16, include three functionally distinguishable parts: (1) the power supply, (2) the upward data circuitry, and (3) the downward data circuitry. If desired, caliper, casing collar, gamma ray, head voltage, and other sensors (not shown), together with any necessary A/D converters, may also be provided in the downhole telemetry circuits 34. The power supply 340 suitably comprises a switching regulator-inverter type power supply capable of accepting either DC or AC inputs. Where a monocable is required, as for through tubing logging for example, the power supply 340 is preferably DC driven, as indicated schematically at 342 in FIG. 16. Where a multiconductor cable can be used, the power supply 340 is preferably AC driven, as indicated at 344 in FIG. 16.

Figure 18:
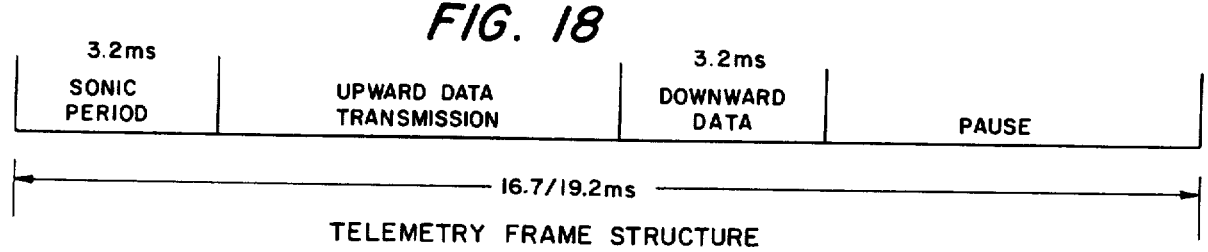
FIGS. 18, 19 and 20 illustrate various data and signal formats used in the telemetry system of FIGS. 16 and 17.

Turning briefly now to FIG. 18, the basic data structure and format of a telemetry frame will be described before proceeding further with the description of the downhole telemetry circuits 34. The initial 3.2 ms period in each frame is reserved for sonic transmission, although this need not be done for purposes of the thermal neutron logging functions of the present invention. This is followed by the upward data from the nuclear logging operations. The upward data consists of words of an odd number of bits in length. Any number of words may be sent so long as they fit in the time period provided. Following the upward data is a 3.2 ms time slot for the downward data. This is followed by a pause until the beginning of the next frame. The individual words consist of an even number of data bits (0, 2, 4, 6, 8, etc.) not exceeding 16, a parity bit and a sync condition which is two bits wide, as is illustrated in FIG. 10.

Returning now to FIG. 16, and if one or more sensors (not shown) are included in the downhole telemetry unit, the parallel-to-serial (P/S) control logic 346 first interrogates, via the fast clock signal FCLK, the A/D converters and associated P/S converter(s) to read out the sensor data. This is done once per frame. When the last bit of sensor data has been shifted out, the P/S control logic 346 passes the clock signal FCLK along to the telemetry interface circuit 78. (See FIG. 3.) As described above in connection with FIG. 12, the telemetry interface circuit 78 generates the telemetry reset signal RST upon completion of the data read out from the near detector and far detector memories 72 and 74. The RST signal is applied to the P/S control logic 346 to reset the serial loop and ready it for the next frame. It also resets the telemetry control-encoder 348.

The telemetry control-encoder 348 accepts the partially encoded serial data (SIG) from the telemetry interface circuit 78 (or from the P/S converter(s) associated with the sensors in the telemetry unit) and phase shift encodes it. The data rate is nominally 10 K bits/-sec. The preferred sense of the encoding is that there will be a phase transition at each bit boundary. If the bit value is "0", no transition takes place at the center of the bit period; if the value is "1", a transition is inserted at the center of the bit period. The sync condition is a 2-bit period during which no transition takes place. The encoded signal is fed to a cable driver (not shown) which places the signal on the cable. The telemetry control-encoder 348 also includes timing circuits for generating the FCLK signal as a 20 KHz continuous square wave, and additional logic circuits for generating the 3.2 ms sonic period and the gating signal CMRG for gating the command receiver 350 for reception of the downward data, also a 3.2 ms period. If no external sync is applied, as when DC power on a monocable is being used, the system runs free at a frame period of 19.2 ms. (See FIG. 18.) When AC is used to power the tool, a zero crossing detector 352 is used to produce a sync pulse at each positive crossing of the 60 Hz power waveform. The telemetry control-encoder 348 then operates the system on a 16.7 ms frame period.

Figure 19:
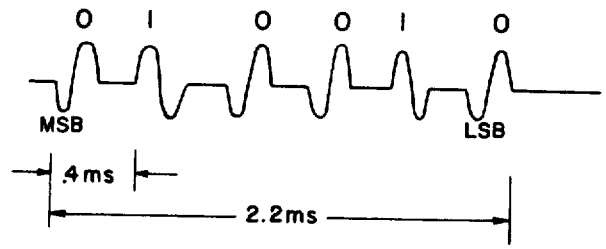
Figure 20:
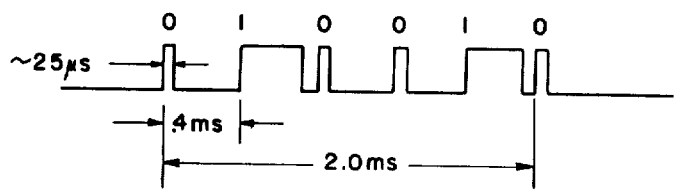

When the surface equipment senses the cessation of upward data transmission, the downward transmission is started. This data is a 6-bit word and is used, as described above, to transmit commands, such as the scale factor command signal, the plateau check command, calibration check command, etc., to the tool 10. The command words are encoded as bipolar pulses with the sense that a leading negative bipolar pulse is a "0" and a leading positive pulse is a "1". The format and timing are illustrated in FIG. 19. As depicted, the most significant bit is transmitted first and the least significant bit last. The two most significant bits can then be used as tool address bits, with the four least significant bits specifying tool functions, such as change F value, plateau check, etc. In the downhole telemetry circuits 34 (FIG. 16), and CMRG signal from the telemetry control-encoder 348 is sent to the command receiver 350 at the end of the upward data transmission, thereby enabling the receiver. In the command receiver, the downward data signal is sensed, decoded and converted into a pulse width-modulated (PWM) signal (using the code illustrated in FIG. 19) as shown in FIG. 20. This is a self-clocking signal designated the CMCD signal, and thus requires only one line.

The CMCD signal is applied to the command decoder circuit 82 in FIG. 3, for use as described above, and also, if desired, to a command decoder circuit (not shown) in the downhole telemetry circuits 34, for use in carrying out any desired operation in the telemetry unit. For example, status checks of any sensors provided therein could be carried out.

With reference now to FIG. 17, the uphole telemetry circuits 36 may be seen to include two basic parts: (1) the upward data receiver and demultiplexer and (2) the downward (or command) data buffer and transmitter. The upward data receiver 354 amplifies and shapes the cable signal, restoring it to the shape it had when put on the cable by the downhole driver circuit. The receiver 354 also senses the cessation of the up data transmission from the downhole circuits 34. The loss of up data signal (NO SIG) is used to synchronize a phaselock loop 356, which provides the necessary timing, via blanking signal BLNK, for gating the receiver 354 on only when telemetry is expected. It also generates an enabling signal ENBL to enable the down data command transmitter 358 during the 3.2 ms down data period of each telemetry frame (see FIG. 18), as well as any required gating signals for the 3.2 ms sonic period.

The restored up data signal from the receiver 354 is fed to a demultiplexer 360 for conversion of the serial data into parallel data on a 16 bit wide up data bus 362. The least significant data bit of the word sent will always appear as the least significant bit in the bus 362 regardless of the length of the word sent. Parity is checked in the demultiplexer 360 and compared to the parity bit telemetered. A "parity valid" signal is included in the data bus. The data on the bus is valid until the arrival of the next telemetry word which can be as soon as 0.7 ms or as late as 1.9 ms. If desired, the up data bus 362 may also contain a 4 bit word identifier number for the purpose of allowing any data handling devices along the data bus to identify data destined for them. The words in the telemetry frame are numbered in order of appearance, with words 1 and 2 being assigned to the downhole telemetry circuits 34 for use in transmitting data acquired by any sensors included in those circuits. Each of these words may be broken up into segments, e.g. of 4 bits each, as needed to accommodate transmission of the data from the sensors.

The up data bus 362 connects to a first in-out first out buffer 364 where the count rate or other data contained in the respective words (as illustrated, for example, in FIG. 10) are held until transferred to the count rate circuits 38.

Commands to the downhole tool 10 are entered through a down data bus 366. As previously mentioned, the down data commands are 6 bit words without parity. The bus 366, then, preferably has seven wires, 6 data bit lines and a busy line. A command may be entered on the bus anytime the busy line is low. The command words are queued up in a first in-first out buffer 368 and are sent downhole one per frame. To that end, the phase lock loop 356 enables the command transmitter 358 at the end of the upward data transmission period of a frame (see FIG. 18) and a command is sent. If no commands are present in the buffer 368, a zero is sent.

Although the invention has been described and illustrated with reference to specific embodiments thereof, many modifications and variations thereof may be made by those skilled in the art without departing from the inventive concepts disclosed. Accordingly, all such modifications and variations are intended to be included within the spirit and scope of the appended claims.

What is claimed is:

1. Apparatus for detecting the decay with time of thermal neutrons in an earth formation for use in measuring thermal neutron decay characteristics of the formation, comprising:
   means for irradiating an earth formation with a discrete burst of fast neutrons during each of a succession of irradiation intervals;
   detector means for detecting indications of the concentration of thermal neutrons in the formation following each neutron burst and for generating signals in response thereto;

signal gating means response to control signals and to said detector-generated signals for transmitting signals from the detector means during a contiguous sequence of discrete time gates during each irradiation interval, said sequence beginning following a discrete time delay after termination of the neutron burst in each irradiation interval and extending over substantially the remainder of the irradiation interval; and control means responsive to a command signal related to the measurement of a thermal neutron capture characteristic of the formation based on indications of the thermal neutron concentration detected during one or more preceding irradiation intervals in said succession of irradiation intervals for generating control signals for controlling the operation of said signal gating means so as to adjust the duration of each discrete time gate occurring in a subsequent irradiation interval by a common, selected one of a finite number of discrete scale factor values, said finite number being less than the number of discrete time gates in each irradiation interval.

2. The apparatus of claim 1 wherein said control means includes means for adjusting the duration of the discrete time delay occurring in said subsequent irradiation interval by said selected scale factor value.

3. The apparatus of claim 1 wherein said control means includes means for adjusting the duration of the discrete neutron burst occurring in said subsequent irradiation interval by selected scale factor value.

4. The apparatus of claim 1 wherein said control means includes:
   oscillator means for generating said control signals, said oscillator means having a separate discrete clock frequency for each of said finite scale factor values; and
   means responsive to said command signal for selecting one of said discrete clock frequencies for use in generating control signals for application to said signal gating means.

5. The apparatus of claim 1 wherein said sequence of time gates comprises a plurality of contiguous groups of gates, each group of which is itself comprised of a plurality of discrete, contiguous time gates, the durations of the time gates being substantially equal within each separate gate group and progressively increasing from group to group in said sequence.

6. The apparatus of claim 5 wherein the number of discrete time gates within each gate group equals the number of gate groups in said sequence.

7. The apparatus of claim 5 wherein the duration of the individual discrete time gates in each gate group after the first-occurring gate group in said sequence is larger by a finite factor than the duration of the individual discrete time gates within the next preceding gate group in said sequence.

8. The apparatus of claim 7 wherein said finite factor is a multiple of the duration of the individual time gates within said next preceding gate group.

9. The apparatus of claim 8 wherein:
   there are four groups of gates in said sequence of time gates and four discrete time gates within each gate group; and
   the finite factor by which the duration of the individual discrete time gates in succeeding gate groups is larger than that of the individual discrete time gates in the next-preceding gate group is two, whereby the gate duration in the second-occurring gate goup is twice the gate duration in the first-occurring gate group, the gate duration in the third-occurring gate group is twice the gate duration in the second-occurring gate group and the gate duration in the fourth-occurring gate group is twice the gate duration in the third-occurring gate group.

10. Apparatus for detecting the decay with time of thermal neutrons in an earth formation, comprising:
    means for irradiating an earth formation with a discrete burst of fast neutrons;
    detector means for detecting indications of the concentration of thermal neutrons in the formation following the neutron burst and for generating signals in response thereto; and
    signal gating means for transmitting signals from the detector means during a time gate sequence which begins following a discrete time delay after termination of the neutron burst and which includes a plurality of contiguous groups of time gates, each group of which is itself comprised of a plurality of contiguous, discrete time gates, the durations of the time gates being substantially equal within each separate gate group and progressively increasing from group to group in said sequence.

11. The apparatus of claim 10 wherein the number of discrete time gates within each gate group equals the number of gate groups in said sequence.

12. The apparatus of claim 10 wherein the duration of the individual discrete time gates in each gate group after the first-occurring gate group in said sequence is larger by a finite factor than the duration of the individual discrete time gates within the next-preceding gate group in said sequence.

13. The apparatus of claim 12 wherein said finite factor is a multiple of the duration of the individual time gates within said next-preceding gate group.

14. The apparatus of claim 13 wherein:
    there are four groups of gates in said sequence of time gates and four discrete time gates within each gate group; and
    the finite factor by which the duration of the individual discrete time gates in succeeding gate groups is larger than that of the individual discrete time gates in the next-preceding gate group is two, whereby the gate duration in the second-occurring gate group is twice the gate duration in the first-occurring gate group, the gate duration in the third-occurring gate group is twice the duration in the second-occurring gate group and the gate duration in the fourth-occurring gate group is twice the gate duration in the third-occurring gate group.

15. A method for detecting the decay with time of thermal neutrons in an earth formation for use in measuring thermal neutron decay characteristics of the formation, comprising:
    irradiating an earth formation with a discrete burst of fast neutrons during each of a succession of irradiation intervals;
    detecting indications of the concentration of thermal neutrons in the formation following each neutron burst and generating signals in response thereto;
    transmitting said signals during a contiguous sequence of discrete time gates during each irradiation interval, said sequence beginning following a discrete time delay after termination of the neutron burst in said irradiation interval and extending over substantially the remainder of said irradiation interval; and controlling the signal-transmitting step, in response to a command signal related to the measurement of a thermal neutron decay characteristic of the formation based on indications of the thermal neutron concentration detected during one or more preceding irradiation intervals in said succession of irradiation intervals, so as to adjust the duration of each discrete time gate occurring in a subsequent irradiation interval by a common, selected one of a finite number of discrete scale factor values, said finite number being less than the number of discrete time gates in each irradiation interval.

16. The method of claim 15 wherein the controlling step further includes the step of adjusting the duration of the discrete time delay occurring in said subsequent irradiation interval by said selected scale factor value.

17. The method of claim 15 wherein said controlling step further includes adjusting the duration of the discrete neutron burst occurring in said subsequent irradiation interval by said selected scale factor value.

18. The method of claim 15 wherein said selected one scale factor value is selected by changing the output frequency of a multiple-frequency oscillator means in response to said command signal, said oscillator means having a separate, discrete output frequency for each of said finite scale factor values.

19. The method of claim 15 wherein said sequence of time gates comprises a plurality of contiguous groups of gates, each group of which is itself comprised of a plurality of discrete, contiguous gates, the durations of the time gates being substantially equal within each separate gate group and progressively increasing from group to group to said sequence.

20. The method of claim 19 wherein the number of discrete time gates within each group equals the number of gate groups in said sequence.

21. The method of claim 19 wherein the duration of the individual discrete time gates in the gate group after the first-occurring gate group in said sequence is larger by a finite factor than the duration of the individual discrete time gates within the next preceding gate group in said sequence.

22. The method of claim 21 wherein said finite factor in a multiple of the duration of the individual time gates within said next preceding gate group.

23. The method of claim 22 wherein:
there are four groups of gates in each sequence of time gates and four discrete time gates within each group; and
the finite factor by which the duration of the individual discrete time gates in succeeding gate groups is larger than that of the individual discrete time gates in the next preceding gate group is two, whereby the gate duration in the second-occurring group is twice the gate duration in the first-occurring gate group, the gate duration in the third-occurring gate group is twice the gate duration in the second-occurring gate group, and the gate duration in the fourth-occurring gate group is twice the gate duration in the third-occurring gate group.

24. The method for detecting the decay with time of thermal neutrons in an earth formation, comprising:
irradiating an earth formation with a discrete burst of fast neutrons;
detecting indications of the concentration of thermal neutrons in the formation following the neutron burst and generating signals in response thereto; and
transmitting signals from the detector means during a time gate sequence which begins following a discrete time delay after termination of the neutron burst and which includes a plurality of contiguous groups of time gates, each group of which itself comprises a plurality of contiguous, discrete time gates, the durations of the time gates being substantially equal within each separate gate group and progressively increasing from group to group in said sequence.

25. The method of claim 24 wherein the number of discrete time gates within each gate group equals the number of gate groups in said sequence.

26. The method of claim 24 wherein the duration of the individual time gates in each gate group after the first-occurring gate group in said sequence is larger by a finite factor than the duration of the individual discrete time gates within the next preceding gate group in said sequence.

27. The method of claim 26 wherein said finite factor is a multiple of the duration of the individual time gates within said next preceding gate group.

28. The method of claim 27 wherein:
there are four groups of gates in said sequence of time gates and four discrete time gates within each gate group; and
the finite factor by which the durations of the individual discrete time gates in succeeding gate groups is larger than that of the individual time gates in the next-preceding gate group is two, whereby the gate duration in the second-occurring gate group is twice the gate duration in the first-occurring gate group, the gate duration in the third-occurring gate group is twice the gate duration in the second-occurring gate group, and the gate duration in the fourth-occurring gate group is twice the gate duration in the third-occurring gate group.

29. Apparatus for detecting the decay with time of thermal neutrons in an earth formation for use in measuring thermal neutron decay characteristics of the formation, comprising:
means for irradiating an earth formation with a discrete burst of fast neutrons of duration T during each of a succession of irradiation intervals;
detector means for detecting indications of the concentration of thermal neutrons in the formation following each neutron burst and for generating signals in response thereto; and
signal gating means responsive to control signals and to said detector-generated signals for transmitting signals from the detector means during a contiguous sequence of discrete time gates during each irradiation interval, said sequence beginning following a discrete time delay after termination of the neutron burst in each irradiation interval and extending over substantially the remainder of the irradiation interval, at least a plurality of said discrete time gates in said sequence having respective durations which progressively increase with time following termination of the neutron burst from a shortest duration of less than T to a longest duration of at least as large as T.

30. The apparatus of claim 29 wherein:
said shortest time gate is a submultiple of T in duration; and subsequent time gates in said plurality of time gates progressively increase in duration therefrom by multiples of said shortest time gate duration.

31. The apparatus of claim 29 wherein:
each sequence of time gates includes a total of sixteen discrete time gates; and
said plurality of time gates includes at least four of said sixteen time gates.

32. Apparatus for detecting the decay with time of thermal neutrons in an earth formation, comprising:
means for repetitively irradiating an earth formation with discrete bursts of fast neutrons of duration T at intervals of a multiple of T;
detector means for detecting indications of the concentration of thermal neutrons in the formation following each neutron burst and for generating signals in response thereto; and
signal gating means for transmitting signals from the detector means during a sequence of discrete time gates, which sequence begins following a discrete time delay after termination of each neutron burst and extends over substantially the remainder of the interval between successive neutron bursts, the number of discrete time gates in said sequence being greater than said multiple and at least a plurality of said discrete time gates having durations which progressively increase with time following the end of the preceding neutron burst from a value of less than T to a value of at least T.

* * * * *